United States Patent
Momtahan et al.

(10) Patent No.: US 9,203,629 B2
(45) Date of Patent: *Dec. 1, 2015

(54) SYSTEM AND METHODS FOR USER-CENTRIC MOBILE DEVICE-BASED DATA COMMUNICATIONS COST MONITORING AND CONTROL

(75) Inventors: Parham Momtahan, Ottawa (CA); Russ Freen, Ottawa (CA); D. Mark Jones, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 657 days.

This patent is subject to a terminal disclaimer.

(21) Appl. No.: 12/773,550

(22) Filed: May 4, 2010

(65) Prior Publication Data

US 2011/0276442 A1    Nov. 10, 2011

Related U.S. Application Data

(60) Provisional application No. 61/175,316, filed on May 4, 2009.

(51) Int. Cl.
  *G07B 17/00* (2006.01)
  *G07F 19/00* (2006.01)
  (Continued)

(52) U.S. Cl.
  CPC .............. *H04L 12/145* (2013.01); *G06Q 30/00* (2013.01); *G06Q 40/12* (2013.12);
  (Continued)

(58) Field of Classification Search
  None
  See application file for complete search history.

(56) References Cited

U.S. PATENT DOCUMENTS 5,713,013 A     1/1998   Black
6,343,085 B1    1/2002   Krishnan et al.
(Continued)

FOREIGN PATENT DOCUMENTS

EP    1119944 B1    9/2006
GB    2436993 A    10/2007
(Continued)

OTHER PUBLICATIONS

International Search Report for International Application No. PCT/IB2010/001084, Canadian Intellectual Property Office, Canada, mailed on Nov. 26, 2010.

(Continued)

*Primary Examiner* — Ariel Yu
(74) *Attorney, Agent, or Firm* — Zilka-Kotab, PC

(57) ABSTRACT

Systems and methods for providing user-centric device-based data communications cost monitoring and controls. In an embodiment, the method operates by sending a registration request associated with a subscriber session, determining current data usage associated with the subscriber, and sending data usage thresholds. The method further comprises sending quotas associated with the subscriber session after collecting data usage information associated with the subscriber session. The method receives a notification at the subscriber's mobile device when a pre-determined quota is exceeded during the subscriber session to control data usage. The system communicates with a usage policy server and a usage policy application. The usage policy application allows a subscriber to alter terms and service tiers of a subscription. The usage policy application displays current data usage information on a per-network and per-application basis using subscriber profile information, subscriber session information, and prior subscriber usage history received from the usage policy server.

20 Claims, 12 Drawing Sheets

(51) Int. Cl.
*H04M 11/00* (2006.01)
*H04L 12/14* (2006.01)
*G06Q 30/00* (2012.01)
*H04M 15/00* (2006.01)
*H04W 4/24* (2009.01)
*G06Q 40/00* (2012.01)

(52) U.S. Cl.
CPC ....... *H04L 12/1403* (2013.01); *H04L 12/1417* (2013.01); *H04L 12/1492* (2013.01); *H04M 15/00* (2013.01); *H04M 15/66* (2013.01); *H04M 15/8228* (2013.01); *H04M 15/83* (2013.01); *H04M 15/8351* (2013.01); *H04M 15/8353* (2013.01); *H04M 15/84* (2013.01); *H04M 15/844* (2013.01); *H04M 15/846* (2013.01); *H04M 15/848* (2013.01); *H04M 15/85* (2013.01); *H04M 15/853* (2013.01); *H04M 15/854* (2013.01); *H04M 15/88* (2013.01); *H04W 4/24* (2013.01); *H04M 2215/204* (2013.01)

(56) References Cited

U.S. PATENT DOCUMENTS

| | | | |
|---|---|---|---|
| 6,577,717 B1* | 6/2003 | Henon | 379/114.01 |
| 6,597,903 B1* | 7/2003 | Dahm et al. | 455/405 |
| 6,832,248 B1 | 12/2004 | Byrnes | |
| 6,941,134 B2* | 9/2005 | White | 455/418 |
| 6,999,449 B2 | 2/2006 | Barna et al. | |
| 7,046,680 B1 | 5/2006 | McDysan et al. | |
| 7,047,312 B1 | 5/2006 | Aweya et al. | |
| 7,113,990 B2 | 9/2006 | Scifres et al. | |
| 7,130,541 B2 | 10/2006 | Farmer et al. | |
| 7,280,818 B2 | 10/2007 | Clayton | |
| 7,417,992 B2 | 8/2008 | Krishnan | |
| 7,434,011 B2 | 10/2008 | Shue | |
| 7,493,081 B2 | 2/2009 | Burdick et al. | |
| 7,493,650 B2 | 2/2009 | Peled et al. | |
| 7,536,455 B2 | 5/2009 | Duffield et al. | |
| 8,055,237 B2 | 11/2011 | Jones et al. | |
| 8,280,346 B2 | 10/2012 | Jones et al. | |
| 8,320,246 B2 | 11/2012 | Foottit et al. | |
| 8,374,576 B2* | 2/2013 | Bedingfield et al. | 455/405 |
| 8,577,329 B2 | 11/2013 | Momtahan et al. | |
| 2002/0046277 A1 | 4/2002 | Barna et al. | |
| 2003/0014367 A1 | 1/2003 | Tubinis | |
| 2003/0028631 A1 | 2/2003 | Rhodes | |
| 2003/0050041 A1 | 3/2003 | Wu | |
| 2003/0110252 A1 | 6/2003 | Yang-Huffman | |
| 2003/0126233 A1* | 7/2003 | Bryers et al. | 709/219 |
| 2004/0019539 A1 | 1/2004 | Raman et al. | |
| 2004/0047324 A1 | 3/2004 | Diener et al. | |
| 2004/0102182 A1 | 5/2004 | Reith et al. | |
| 2004/0156489 A1 | 8/2004 | Vishik et al. | |
| 2004/0203578 A1 | 10/2004 | Toriyama | |
| 2004/0260630 A1* | 12/2004 | Benco et al. | 705/30 |
| 2005/0152300 A1 | 7/2005 | Edsberg | |
| 2005/0239494 A1* | 10/2005 | Klassen et al. | 455/550.1 |
| 2006/0079228 A1 | 4/2006 | Marsico et al. | |
| 2006/0090076 A1 | 4/2006 | De Cnodder et al. | |
| 2006/0141984 A1 | 6/2006 | Taglienti et al. | |
| 2006/0143028 A1 | 6/2006 | Altmann et al. | |
| 2006/0217116 A1 | 9/2006 | Cassett et al. | |
| 2006/0276180 A1 | 12/2006 | Henry, Jr. | |
| 2007/0016666 A1 | 1/2007 | Duffield et al. | |
| 2007/0177626 A1 | 8/2007 | Kotelba | |
| 2008/0096524 A1 | 4/2008 | True et al. | |
| 2008/0256537 A1 | 10/2008 | Fachan et al. | |
| 2009/0068984 A1* | 3/2009 | Burnett | 455/408 |
| 2009/0197597 A1* | 8/2009 | Kotecha | 455/433 |
| 2009/0203352 A1 | 8/2009 | Fordon et al. | |
| 2009/0281688 A1* | 11/2009 | Hadley et al. | 701/29 |
| 2009/0327075 A1* | 12/2009 | Saadat et al. | 705/14.53 |
| 2010/0015926 A1* | 1/2010 | Luff | 455/67.13 |
| 2010/0022216 A1 | 1/2010 | Bandera et al. | |
| 2010/0035576 A1 | 2/2010 | Jones et al. | |
| 2010/0217855 A1 | 8/2010 | Przybysz et al. | |
| 2011/0151831 A1* | 6/2011 | Pattabiraman | 455/405 |
| 2011/0264726 A1 | 10/2011 | Zabawskyj et al. | |
| 2011/0275344 A1* | 11/2011 | Momtahan et al. | 455/405 |
| 2011/0276442 A1 | 11/2011 | Momtahan et al. | |
| 2012/0030017 A1 | 2/2012 | Jones et al. | |

FOREIGN PATENT DOCUMENTS

| | | |
|---|---|---|
| JP | 2001028777 A | 1/2001 |
| WO | 9965184 A2 | 12/1999 |
| WO | 0125877 A2 | 4/2001 |
| WO | WO 2007/105123 A2 | 9/2007 |

OTHER PUBLICATIONS

The Written Opinion of the International Searching Authority for International Application No. PCT/IB2010/001084, Canadian Intellectual Property Office, Canada, mailed on Nov. 26, 2010.
U.S. Appl. No. 12/773,542, Inventors Momtahan, P., et al., filed on May 4, 2010 (Not-Published).
U.S. Appl No. 12/708,299, Inventors Foottit, T., et al., filed on Feb. 18, 2010 (Not-Published).
Notice of Allowance from U.S. Appl. No. 12/186,831, dated Sep. 19, 2011.
Notice of Allowance from U.S. Appl. No. 13/267,824, dated Apr. 16, 2012.
Non-Final Office Action from U.S. Appl. No. 13/267,824, dated Nov. 28, 2011.
Notice of Allowance from U.S. Appl. No. 12/708,299, dated Jul. 19, 2012.
Non-Final Office Action from U.S. Appl. No. 12/708,299, dated Feb. 28, 2012.
Massoulie, L. et al., "Bandwidth sharing: objectives and algorithms," IEEE, 1999, pp. 1395-1403.
Anjum, F. et al., "Fair Bandwidth Sharing among Adaptive and Non-Adaptive Flows in the Internet," IEEE, 1999, pp. 1412-1420.
International Search Report and Written Opinion from International Application No. PCT/IB2010/000470, dated Jul. 29, 2010.
Pias, M. et al., "Securing the Internet Metering and Billing," IEEE Global Telecommunications Conference, Nov. 2002, vol. 2, pp. 1603-1607.
Rigney, C., "Remote Authentication Dial in User Service (RADIUS)," RFC 2865, Jun. 2000, pp. 1-76.
International Search Report and Written Opinion from International Application No. PCT/IB2009/005370, dated Jul. 2, 2010.
Calhoun, P. et al., "Diameter Base Protocol," Network Working Group, RFC 3588, Sep. 2003, pp. 1-147.
Eronen, P. et al., "Diameter Extensible Authentication Protocol (EAP) Application," Network Working Group, RFC 4072, Aug. 2005, pp. 1-33.
Rigney, C., "RADIUS Accounting," Network Working Group, RFC 2866, Jun. 2000, pp. 1-28.
Non-Final Office Action from U.S. Appl. No. 12/773,542, dated May 7, 2013.
Notice of Allowance from U.S. Appl. No. 12/773,542, dated Sep. 3, 2013.
First Examination Report in India Patent Application No. 2702/KOLNP/2010, mailed Jun. 30, 2015.

* cited by examiner

SYSTEM AND METHODS FOR USER-CENTRIC MOBILE DEVICE-BASED DATA COMMUNICATIONS COST MONITORING AND CONTROL

CROSS REFERENCE TO RELATED APPLICATIONS

The present application claims priority to U.S. Provisional Patent Application No. 61/175,316, entitled System and Methods for Mobile Device-Based Data Communications Cost Monitoring and Control, tiled on May 4, 2009 by Momtahan et al., which is hereby expressly incorporated by reference in its entirety.

The present application is also related to commonly owned, co-pending U.S. patent application Ser. No. 12/186,831, entitled, Usage Measurement Collection and Analysis to Dynamically Regulate Customer Network Usage, tiled on Aug. 6, 2008 by Jones et al., which is hereby expressly incorporated by reference in its entirety.

The present application is also related to commonly owned, co-pending U.S. application Ser. No. 12/708,299, entitled Adaptive Window Size for Network Fair Usage Controls, by Foottit et al., which is hereby expressly incorporated by reference in its entirety.

FIELD OF THE INVENTION

The present invention relates generally to communications networks, more particularly, to monitoring and controlling data communications costs within wireless communications networks.

BACKGROUND

Portable computing devices such as laptop computers, personal data assistants (PDAs), smart phones and the like are in common usage, many featuring data communications support, powerful processors, larger and more colorful displays, and wireless networking and internet browsing capabilities. These advances in mobile technology have resulted in a dramatic increase in the volume of data communicated on wireless networks. These advances, coupled with subscribers seeking expanded mobility, will drive subscribers install and run data-hungry applications on their mobile devices. Data traffic is growing due to a combination of increasing market share of data-centric portable devices such as IPHONE™ and BLACKBERRY™ devices, lower wireless data subscription costs, higher wireless data throughput, and easier mobile access to data-intensive applications and rich content such as video. These trends are driving ever-increasing demands for wireless data communications.

Typically, users gain access to wireless data networks by purchasing a subscription plan from a service provider. In response to the explosive growth in mobile data traffic, service providers currently offer a wide variety of wireless subscription plan features such as actual usage plans, flat-rate plans, bandwidth caps that limit the amount of data per month for a mobile device, pre-paid and post-paid data plans. These plans typically impose limits on subscriber bandwidth consumption, often combined with additional fees for exceeding those limits. Bandwidth caps can alleviate network congestion by reducing overall mobile data traffic, but these caps reduce the attractiveness of data service for subscribers.

In a flat rate subscription plan a subscriber pays a fee for a billing cycle and is entitled to a set amount of network usage (i.e., a usage quota) during the billing cycle. For example, a subscriber may pay $30 for a month and be entitled to 500 minutes of network time. The usage quota can be specified as a time per billing cycle amount (e.g., 500 minutes per month) or as a data volume per billing cycle amount (e.g., 40 Mega Bytes per month). In some flat rate subscription plans, the usage quota is unlimited.

In an actual usage subscription plan a subscriber pays a set rate based on the actual amount of network usage during a billing cycle. For example, a user may pay $1 per minute of network usage. Actual usage plans can have incentives/penalties based on a subscriber's usage during a billing cycle. For example, in a subscription plan a subscriber may pay $1 per Mega Byte (MB) for the first 50 MBs and $2 per Mega Byte (MB) for every MB used beyond 50 MBs during the billing cycle. Subscription plans can combine aspects of flat rate plans and usage plans. For example, a subscriber may pay $30 per month for 40 MBs of wireless data usage and $1 per MB for every minute used after 40 MBs.

In the plans described above, as well as other subscriber plans, it is useful for a subscriber to be able to monitor his/her usage against one or more quotas.

Given the increasing versatility of mobile devices, it is helpful to implement a means by which these mobile devices can be used to monitor and control data communication costs, and to improve the subscriber experience.

Previous methods for network data communications cost monitoring and control are largely provider-centric, leaving the user with limited options to control and monitor costs. For example, a subscriber may be able to display cumulative consumption in MBs for the current month to determine if a monthly quota has been exceeded, but the subscriber cannot dynamically control and manage data communications costs without permanently changing his/her subscription plan. Provider-centric systems monitor usage and may allow subscribers to access usage information via a provider's web server, but they do not allow subscribers to set real time usage controls. For example, provider-centric systems do not allow subscribers to set data usage thresholds, quotas, or caps on their devices each day based upon prior usage. Prior network data control techniques result in extra charges (i.e., due to roaming) and surprise data charges for subscribers who exceed bandwidth caps.

In prior systems, subscribers must rely on providers to monitor and control data usage. When a portable device moves to another provider network (i.e., roam), the amount of data usage information is limited to what the network the device is roaming in provides. For example, subscribers may not know what data charges (i.e., tariffs) apply while roaming. Prior techniques can result in excessive fees for subscribers who have unknowingly exceeded their plan's data quotas or caps. Subscribers cannot dynamically manage and control data costs for current data connections from their portable devices. In prior systems, subscribers only have data usage information in terms of overall volume of data used for all applications on a device, rather than the amount of data user per application. This lack of device-centric control and transparency limits the subscriber experience and causes subscribers to unnecessarily curtail their data usage.

What is therefore needed are systems and methods for providing device-based data communications cost monitoring and controls on a per application basis. What is further needed are systems and methods to allow subscribers to monitor and control expenditures on data services by providing proactive notification when subscribers are approaching bandwidth caps. What is also needed are systems and methods to allow subscribers to modify their plans either temporarily or permanently depending on their needs by providing add-on service availability (i.e., the ability to dynamically raise a bandwidth cap temporarily).

SUMMARY OF THE INVENTION

Embodiments of the present invention provide systems and methods that improve data communication usage and cost monitoring operations. An embodiment of the invention includes a system for monitoring and control of the data usage that is based on a subscriber's device. Methods are disclosed that use a distributed system that runs on user equipment and mobile devices.

In an embodiment, a system provides subscribers with access to real-time information about data usage, and are given warnings that they are close to reaching bandwidth caps. The system notifies subscribers when they are close to reaching bandwidth caps or quotas and offers subscribers an opportunity to upgrade to a next service tier.

The invention also provides a method for managing data usage by allowing subscribers to gradually reduce download speeds, block some types of traffic, redirect device connection to on-portal applications, or select a new Quality of Service (QoS) level in order to manage bandwidth consumption. In this way, the invention makes different options available to subscribers, and lets them decide how to best-manage data usage according to their needs and priorities.

The invention additionally includes methods that use a distributed usage monitoring and control system that comprises applications that run on user devices.

Embodiments of the invention also include methods for performing cost monitoring and control on a per-application basis.

In an embodiment, the invention includes a centralized system for global monitoring and control of a plurality of mobile devices from a single, cross-provider (i.e., global) perspective.

Subscription data is used to calculate the likelihood of exceeding a quota (i.e., a quota breach) at a given time and this information is provided to a user of a mobile device. U.S. application Ser. No. 12/186,831, filed Aug. 6, 2008 and entitled "Usage Measurement Collection and Analysis to Dynamically Regulate Customer Network Usage," describes methods and systems for calculating the likelihood of a quota breach. The present application includes the capabilities described therein. According to an embodiment of the present invention, a notification is sent to a subscriber when it is determined that a quota breach is likely to occur. In a related embodiment, subscribers are given the opportunity to change a service tier associated with their subscription in order to prevent a likely quota breach.

In an embodiment, a service provider can present marketing offers (i.e., 'special offers') to a subscriber that provide the subscriber with an opportunity to change a service tier associated with their subscription. In further embodiments, acceptance of marketing offers can change service tiers associated with a subscriber's home network or roamed networks. According to embodiments of the invention, marketing offers can be sent to a subscriber by their home network service provider or roamed network service providers and are presented on the subscriber's mobile device.

In embodiments, both dynamic and static subscriber characteristics relative to a current usage session can be used to allow a subscriber to proactively manage data usage. Dynamic characteristics can be dynamic relative to the start of a usage session or relative to the usage session generally. An example of a dynamic characteristic relative to the start of a usage session is the type of data requested and the mobile applications requesting data. An example of a dynamic characteristic relative to the usage session is the total amount of data usage.

In a further embodiment, a subscriber characteristic used in data usage calculations includes knowledge of peak usage patterns (e.g., on peak/off-peak, weekdays).

It is an objective of the present invention that it may be incorporated into any mobile device capable of data communications.

In another embodiment, when a subscriber is roaming and the roaming traffic is not routed through the subscriber's home service provider home agent router or network access gateway, an interaction between the roamed service provider and home service provider occurs so that the home service provider has the information needed to control data usage in the roamed or visited network.

Another objective of the invention is to provide flexible policy descriptions for network service provider (carrier) charging plans. A further objective of the invention is to provide flexible tariff distribution. According to an embodiment of the invention, distribution of flexible policy descriptions associated to network service provider charging plans is achieved by using a provider-based architecture. In an embodiment, a provider-dependent (i.e., carrier-based) architecture is also used to distribute tariffs associated with network service providers.

Further embodiments, features, and advantages of the invention, as well as the structure and operation of the various embodiments of the invention are described in detail below with reference to accompanying present drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
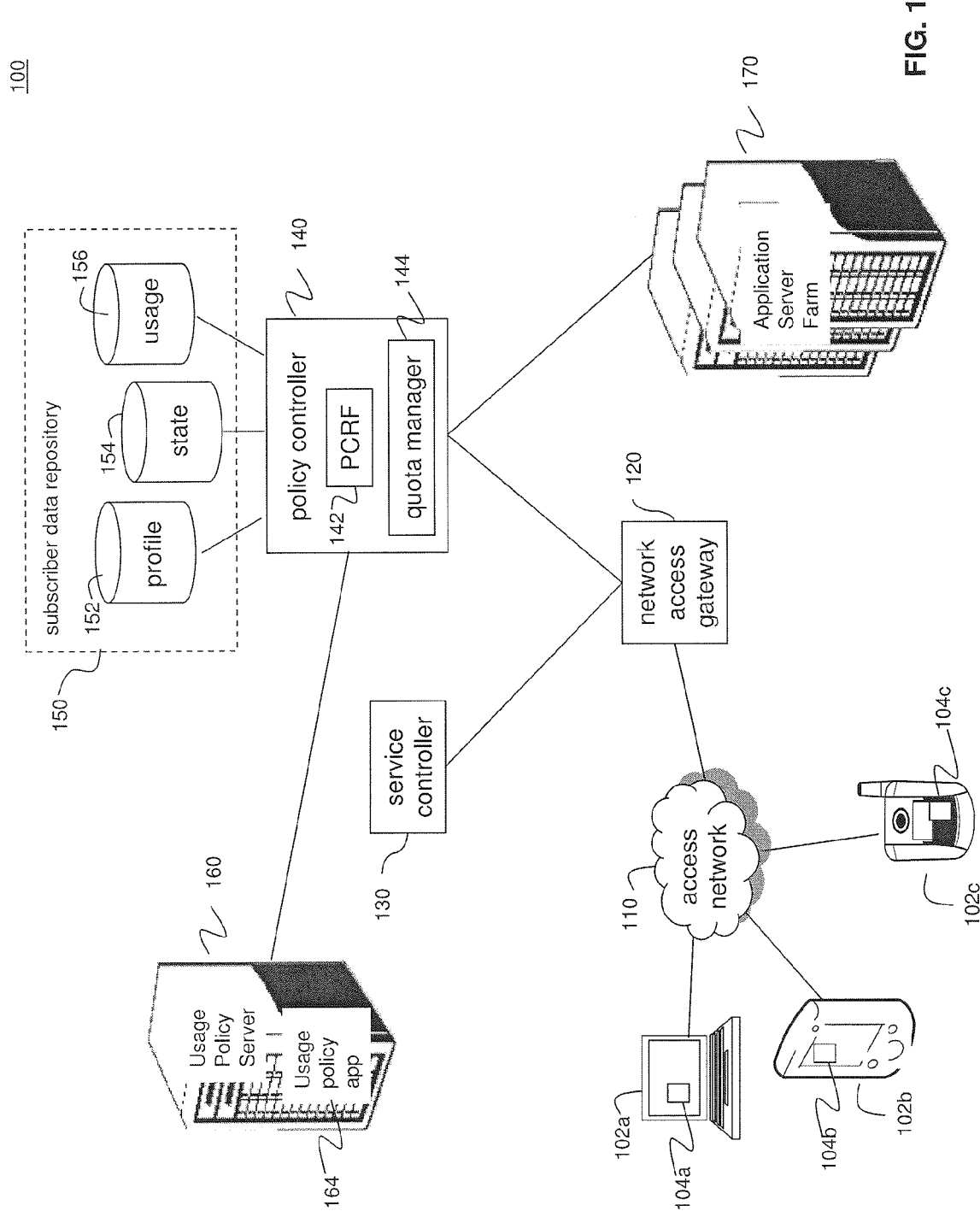
FIG. 1 depicts an exemplary operating environment for providing network data communications cost monitoring and controls within a communications network, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Mobile Environment

FIG. 1 provides an exemplary operating environment 100 for providing network data communications cost monitoring and controls, according to embodiments of the present invention. Operating environment 100 includes user equipment 102, network access gateway 120, optional service controller 130, policy controller 140, subscriber data repository 150, usage policy server 160, and application server farm 170. Operating environment 100 provides a simplified diagram of a communications network to illustrate the concepts of data communications cost monitoring and controls. As would be recognized by persons of skill in the art, embodiments of the present invention can be used in any type of communications network (e.g., wireline, wireless, or hybrid networks).

User equipment 102 is any device that provides a user access to one or more networks. User equipment 102 can include, but is not limited to, a computer such as user equipment 102a, a personal digital assistant (PDA) such as user equipment 102b, a wireless phone such as user equipment 102c, a smart phone, other wireless mobile devices, and/or wired communications devices.

Access network 110 is a communications network that couples user equipment 102 to a packet data network (not shown). Access network 110 may be a third generation partnership project (3GPP) access network or a non-3GPP access network. Exemplary 3GPP access networks include the UMTS terrestrial radio access network (UTRAN) and the GSM EDGE radio access network (RAN). Other access networks include, but are not limited to, WiFi, WiMAX, CDMA2000, GSM, and UMTS.

Network access gateway 120 provides an interface between access network 110 and a packet data network (not shown). In a 3GPP network, network access gateway 120 may be the Gateway General Packet Radio Service (GPRS) Support Node (GGSN). Note that network access gateway 120 may also act as a policy enforcement point.

Policy controller 140, at a high level, includes subscriber profiles and network policies needed to manage network resources, such as bandwidth, according to a subscriber, session, and/or application. A service provider may apply a policy based on business rules associated with a variety of factors (e.g., service tiers and/or dynamic parameters such as time of day).

Policy controller 140 includes a policy and charging rules function (PCRF) 142 and a quota manager 144. For example, in a 3GPP network, PCRF 142 acts as a decision point for policy and charging control of service data flows. PCRF 142 is configured to select and provide the applicable policy and charging control decisions to the policy control enforcement point.

Usage policy server 160 works in conjunction with policy controller 140 to extend policy and charging control of service data flows to user equipment 102. These data flows may be monitored and controlled on a per subscriber, per user equipment, or per application basis. For example, control and metering of data flows from applications hosted in application server farm 170 to user equipment 102a may be performed by usage policy server 160. Alternatively, control and metering of data flows for a particular subscriber using user equipment 102a may be performed by usage policy server without regard to the applications being invoked by the subscriber. Similarly, control and metering of data flows between a pool of related subscribers (i.e., subscribers in the same family, organization, or corporation) using user equipment 102a-c may be performed by usage policy sever 160, regardless of the applications involved in the data flows. Although the exemplary environment 200 depicts usage policy server 160 as a separate server from policy controller 140, as would be understood by those skilled in the relevant art(s) usage policy server 160 may be implemented as software residing in policy controller 140. Conversely, policy controller 140 may comprise software residing on usage policy server 160

According to an embodiment of the invention, a subscriber using user equipment 102 can set usage limits in mobile usage policy application 104 running on user equipment 102. For example, a subscriber using user equipment 102a can use mobile policy application 104a to set total daily usage limits in Mega Bytes (MBs), which are communicated to usage policy server 160 via access network 110, network access gateway 120, and policy controller 140. Subscribers can also set data usage notification and stop thresholds in mobile usage policy application 104. Upon reaching a notification threshold (i.e., 400 MBs in the example embodiment depicted in FIG. 7), a subscriber will receive a notification on user equipment 102. At that point, the subscriber can optionally set a new, higher usage limit in mobile usage policy application 104, or choose to curtail data usage. Upon reaching a stop threshold (i.e., 600 MBs in the example embodiment depicted in FIG. 7), a subscriber will be unable to use additional data services on user equipment 102 until a higher usage limit is set in mobile usage policy application 104 or server-side usage policy application 164.

Usage policy server 160 provides usage policy data to policy controller 140. Quota manager 144 is configured to collect data communications usage and cost data. Quota manager 144 provides data communications cost monitoring and data to user equipment 102a-c via network access gateway 120 and access network 110. If the subscriber exceeds a data usage cap or threshold, quota manager 144 provides this information to user equipment 102a-c and usage policy server 160. In an embodiment, server-side usage policy application 164 running on usage policy server 160 allows subscribers to set data usage controls via a web portal (See FIGS. 2 and 3). Data usage controls include, but are not limited to, total daily usage thresholds, total hourly usage thresholds, per-application usage thresholds, per-device usage thresholds, and thresholds based on data sources (i.e., Uniform Resource Locator/URL addresses or Internet Protocol/IP addresses). In an alternative embodiment, a mobile usage policy application 104 running on user equipment 102 allows subscribers using user equipment 102 to set data usage controls, such as, but not limited to the thresholds mentioned above directly on user equipment 102.

Quota manager 144 is configured to provide dynamic usage controls according to a variety of techniques including, but not limited to, using pre-defined value or values, calculating fair usage windows based on one or more formulas, and/or determining new usage windows based on how quickly previous windows were violated. These techniques are described in further detail in U.S. application Ser. No.

12/708,299, entitled Adaptive Window Size for Network Fair Usage Controls, which is hereby expressly incorporated by reference in its entirety.

Policy controller 140 is coupled to subscriber data repository 150. Subscriber data repository 150 includes a subscriber profile database 152, a subscriber state database 154, and a subscriber usage database 156. Although depicted as three separate databases in FIG. 1, a person of ordinary skill in the art will recognize that subscriber profile, subscriber state, and subscriber usage data may be stored in any number of databases.

Policy controller 140 is further coupled to network access gateway 120. In an embodiment, the interface between policy controller 140 and network access gateway 120 is a Gy interface.

Subscriber state database 154 includes information that identifies and defines a subscriber's network session. Subscriber state information includes the subscriber identifier for the session. In embodiments of the invention, subscriber identifiers may be one or more of a Mobile Subscriber ISDN Number (MSISDN), a Mobile Identification Number (MIN), a Private Identifier, information about the network such as the IP address the subscriber is currently using and what network or networks to which the subscriber is currently connected, device information such as the device being used and the version of the software, location and roaming information, and other unique state information.

When a subscriber connects to any network, the core elements of the network assign an Internet Protocol (IP) address to the subscriber. At that time, the subscriber session begins and subscriber state information is created, derived and captured. For example, state information is typically generated either through RADIUS accounting or through interactions with the dynamic host control protocol (DHCP) service on a network. The accounting message feeds are generated to a Remote Authentication Dial In User Service (RADIUS) engine or an authentication, authorization and accounting (AAA) service from core network elements.

Subscriber profile database 152 includes static information about the subscriber. This information may include the service tier (e.g., gold, silver, bronze) assigned to the subscriber. In an embodiment of the invention, service tiers are associated with Quality of Service (QoS) levels.

Subscriber usage database 156 includes static and dynamic information related to the subscriber's history. The subscriber's history includes, but is not limited to the subscriber's data usage history. In embodiments of the present invention, subscriber usage database 156 may store information about the amount of data used on a per-application basis by the subscriber's user equipment 102 in previous sessions. Usage policy server 160 uses the per-application usage data from prior sessions to inform the subscriber about which applications running on user equipment 102 have consumed the most bandwidth or data based on previous behavior patterns.

According to an embodiment of the invention, a carrier or provider-based infrastructure is used wherein the service provider infrastructure provides data metering and control. In this architecture, usage policy server and server-side usage policy application 164 are used to control and meter data usage on user equipment 102.

In another embodiment, a carrier-independent infrastructure is used whereby metering and control is performed on user equipment 102 using mobile usage policy application 104. In this embodiment, some centralized functions are performed by policy controller 140 and usage policy server 160, such as controlling data usage policies across multiple user equipment 102a-c. In this embodiment, longer-term historical storage of usage information occurs in subscriber usage database 156 within subscriber data repository 150.

In an embodiment, a hybrid architecture gathers usage data on user equipment 102 but long-term storage of the usage data occurs in subscriber usage database 156 within subscriber data repository 150. In this way, centralization is performed within a service provider infrastructure. This architecture is useful for the roaming scenario depicted in FIG. 2 and described below.

Figure 2:
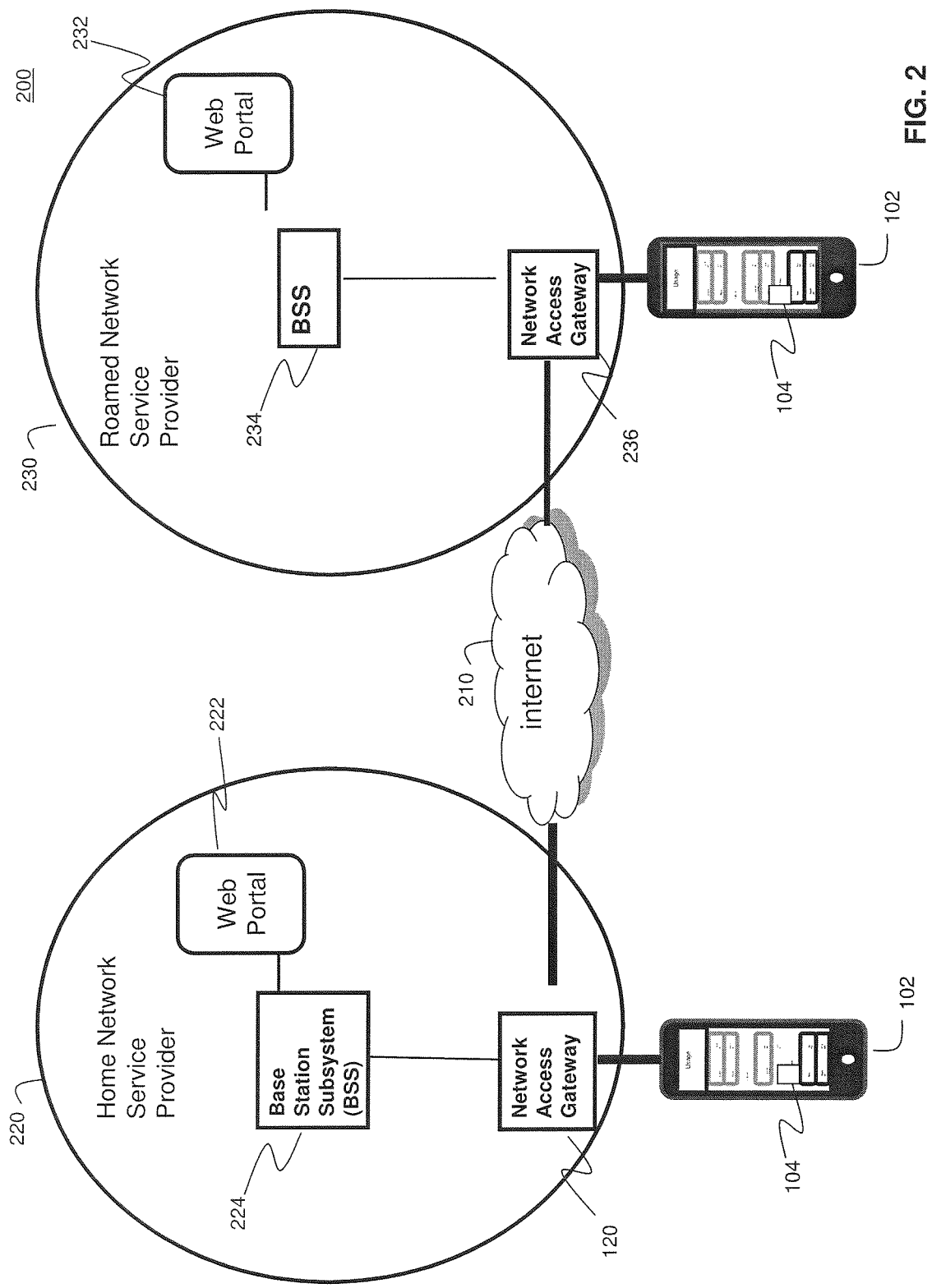
FIG. 2 depicts an exemplary operating environment for providing data communications cost monitoring and controls in a roaming scenario including multiple communications networks, in accordance with an embodiment of the present invention.

FIG. 2 depicts an exemplary operating environment 200 for providing data communications cost monitoring and controls while roaming. Although the exemplary environment 200 depicts two network service providers, home network service provider 220 and roamed network service provider 230, as would be understood by those skilled in the relevant art(s), user equipment 102 may connect to a plurality of roamed network service providers 230 while roaming.

FIG. 2 is described with continued reference to the operating environment of FIG. 1. However, environment 200 is not limited to that embodiment.

Mobile data costs for a subscriber using user equipment 102 may be based on data volume used within a period. For example, a subscriber's subscription may entail a charge of $60 up to a 1 Giga Byte (GB) cap of data access each month with a $3 per MB charge after the 1 GB cap has been exceeded. Data costs also vary based on the home network service provider 220 that user equipment 102 is homed in or connected to. Typically, data costs increase when user equipment 102 is roaming in roamed network service provider 230. Due to these and other dynamic factors that can increase data costs, embodiments of the present invention enable subscribers to monitor and control expenditure on data services on user equipment 102 on a real time basis.

In accordance with a 'provider-centric' embodiment of the invention, monitoring and control of usage and charging for data is performed by methods and systems that reside within home network service provider 220 and remain under the control of home network service provider 220. In the provider-centric embodiment, home network access gateway 120 and roamed network access gateway 236 monitor and control packet traffic between user equipment 102 and the Internet 210. Home network access gateway 120 and roamed network access gateway 236 generate usage accounting records that are input to off-line or on-line (prepaid) billing and reporting systems residing in base station subsystems 224 and 234. Examples of home network access gateway 120 and roamed network access gateway 236 include, but are not limited to gateway GPRS Support Node (GGSN), Packet Data Serving Node (PDSN), Deep Packet Inspection (DPI), and "Evolved NodeB (eNodeB).

Home network service provider 220 and roamed network service provider 230 may provide visibility of data usage records via a website user interface to subscribers that log in to check their account via web portals 222 and 232.

According to an embodiment, subscribers can monitor and control their data usage via web portals 222 and 232. For example, subscribers can select service extensions, data usage boosts, a lower bandwidth service, or other alternatives via home network web portal 222 and/or roamed network web portal 232. These changes are then passed to usage policy server 160 and propagated to server-side usage policy application 164. In an alternative embodiment, changes made via home network web portal 222 and roamed network web portal 232 are propagated to mobile usage policy application 104 resident on user equipment 102.

In another embodiment, when a subscriber is roaming and the roaming traffic is not routed through the subscriber's home service network provider 220 home agent or home network access gateway 120, an interaction between a usage policy server 160 in roamed network service provider 230 and a usage policy server 160 in home network service provider 220 is initiated. This interaction between the respective usage policy servers includes a request being sent from usage policy server 160 in home network service provider 220 to a usage policy server 160 in roamed network service provider 230. According to an embodiment, the request is for information that home network service provider 220 needs in order to affect data usage controls for user equipment 102 while it is accessing data in roamed network service provider 230.

In an embodiment, to prevent unexpectedly high roaming charges from roamed network service provider 230, a subscriber using user equipment 102 may select, using usage policy application 104 to be barred from all or some data applications while roaming in the network of roamed network service provider 230. For instance, a subscriber using a mobile device such as user equipment 102 may wish to avoid the high cost of data services while they are outside the coverage area of home network service provider 220, but retain the data service when they are not roaming.

According to an embodiment, while user equipment 102 is using roamed network service provider 230, a subscriber may opt to have certain applications from application server farm 170 blocked.

Operators of home network service provider 220 and roamed network service provider 230 can detect access to on- or off-portal applications, and they typically choose to charge less, or impose no data fees, for access to on-portal applications from user equipment 102. In an embodiment, a subscriber may choose to select only on-portal applications (either in home network service provider 220 or roamed network service provider 230) in order to reduce data usage and costs.

In instances when access network 110 depicted in FIG. 1 becomes congested, an embodiment of the invention provides real-time traffic information from access network 110 and, more specifically, from individual base station subsystems 224 and 234 which enables operators of home network service provider 220 or roamed network service provider 230 to identify areas of congestion within their respective access networks 110. Policy controller 140 includes operator tools to contain congestion in real-time by temporarily enforcing more stringent policies (i.e., not allowing bursting behavior, or assigning lower priority to subscribers with low-tier service plans).

In an embodiment, in order to prevent 'bill shock' due to exceeding data quotas and in order to extend usage control to subscribers, mobile usage policy application 104 works in conjunction with policy controller 140 to provide proactive notifications to user equipment 102 when subscribers are nearing bandwidth usage thresholds or data roaming charge limits in roamed network service provider 230. Subscribers can then be given choices in real-time in mobile usage policy application 104, such as a service extension, a data usage boost, a lower bandwidth service, or other alternatives. In addition, operators of home network service provider 220 or roamed network service provider 230 can extend control to subscribers to set personalized usage caps that can be updated in real-time based on personal financial limits, or to boost roaming data usage while a subscriber is traveling.

Data Monitoring and Control Systems

Figure 3:
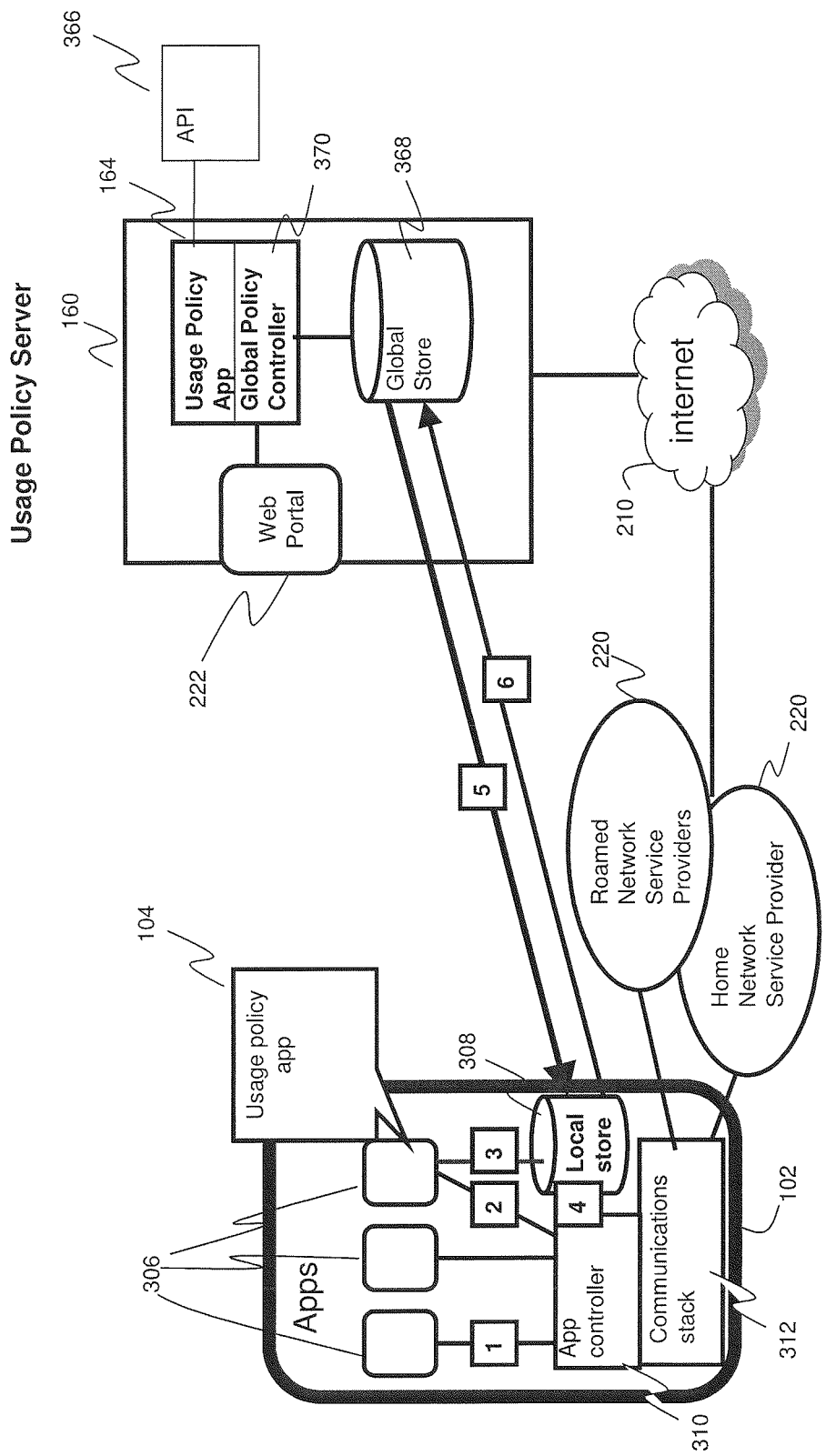
FIG. 3 illustrates a provider independent system architecture for providing data communications cost monitoring and controls within a communications network, in accordance with an embodiment of the present invention.

FIG. 3 illustrates an architecture for a system 300 for providing data communications cost monitoring and controls within a communications network, in accordance with an embodiment of the present invention. System 300 is provider independent in that the architecture is distributed between user equipment 102 and a usage policy server 160.

FIG. 3 is described with continued reference to the operating environments of FIGS. 1 and 2. However, system 300 is not limited to those embodiments.

In an embodiment, monitoring and control of the data usage is based on user equipment 102 using mobile usage policy application 104, instead of within the infrastructure of home network service provider 220 or roamed network service providers 230. This distributed system runs on user equipment 102 and usage policy server 160. In system 300, the charging/cost monitoring and control can be performed down to the level of the individual applications 306 running on user equipment 102. Applications 306 may include, but are not limited to games, social networking applications, Voice over Internet Protocol (VoIP) applications such as Skype, and wireless access to data-intensive web sites that host multimedia content such as video.

According to an embodiment, a device usage control subsystem (executes on user equipment 102 and monitors data flows (denoted as 1-4) on user equipment 102. The device usage control subsystem comprises the following components: local store 308, application controller 310, and mobile usage policy application 104. These components are described in the following paragraphs.

Application controller 310 is installed to mediate between applications 306 and communication stack 312 of user equipment 102. In an embodiment, communication stack 312 is a Transmission Control Protocol (TCP)/Internet Protocol (TCP/IP) stack. Application controller 310 presents a virtual socket layer to applications 306. Application controller 310 also counts how many bytes each application 306 sends and receives (denoted as data flow 1). Application controller 310 also stores the data usage on a per-application basis in local store 308 (denoted as data flow 4). Application controller 310 checks for application data usage threshold limits defined in the local store by the mobile usage policy application 104. In an alternative embodiment, application controller 310 checks for application data usage threshold limits defined in the global store 368 by the server-side usage policy application 164, which can be accessed via calls to Application Programming Interface (API) 366.

In an embodiment, data usage information for a single device is stored in a data store, such as local store 308 on user equipment 102. 2. Local store 308 may use non-volatile storage on user equipment 102 to hold information such as, but not limited to, data usage for each application 306, data budgets, thresholds, tariff information, and statistics regarding highest budget applications 306. Each of these types of information is described below.

Each of the types of information described below may optionally be stored in local store 308 on user equipment 102. The information described below may also be periodically imported from or exported information to global store 368 residing on one or more usage policy servers 160.

Data 'budgets' for applications 306 or groups of applications 306 can be set in mobile usage policy application 104 or server-side usage policy application 164. In an embodiment, after reaching its budgeted allocation for a given period, an application 306 is capped or blocked from further data network usage. According to this embodiment until that period is elapsed (or the budget is changed or over-ridden by a subscriber), application 306 will be blocked from performing additional data transactions, thereby allowing the subscriber to control data costs that may otherwise cause 'bill shock.'

Thresholds for applications 306 are kept, whereby the subscriber is notified that an application 306 or group of applications 306, if a subscriber has set a threshold of 75% for an application 306, when that application 306 has consumed 75% of its data budget, the subscriber will receive a notification at user equipment 102.

Tariffs comprise information kept for each known potential roamed network service provider 230 in which the subscriber can roam, so that the user has control over which roamed network service provider 230 would be most cost-effective to use. Tariff information pertaining to a plurality of roamed network service providers 230 may be stored in a local store 308 on user equipment 102. Tariff data for each roamed network service provider 230 may reside in a database or data store on usage policy server 160, such as global store 368.

According to an embodiment, local store 308 may periodically import or export tariff information via data flows 5 and 6, respectively, to global store 368 residing on one or more usage policy servers 160 associated with one or more roamed network service providers 230. Tariff information stored in global store 368 and a plurality of local stores 308 can be used to provide flexible tariff distribution. In an embodiment of the invention, a carrier-based architecture is used to distribute tariffs stored in global store 368 and local stores 308.

Statistics regarding highest budget applications 306 include cumulative data usage information kept in order to meter and display subscribers, user equipment 102, and/or applications 306 using highest budgeted amount of data for a give period. For example, statistics may be kept on a single user equipment 102 regarding applications 306 on a particular user equipment 102 which have used the largest amount of data. Statistics may also be compiled on usage policy server 160 regarding data usage for a plurality of subscribers and/or user equipment 102.

In accordance with an embodiment of the invention, data usage pertaining to a plurality of subscribers is stored in a data store on usage policy server 160, such as global store 368. According to an embodiment, local store 308 may periodically import or export information via data flows 5 and 6, respectively, to global store 368 residing on one or more usage policy servers 160 associated with one or more network service providers.

According to an embodiment, the types of data described in the following paragraphs are modeled by usage policy application 104 and stored in a local store such as local store 308.

Usage entity data, including, but not limited to data identifying a network service provider such as home network service provider 220, network type (WiFi, 3G, etc.), user equipment 102 device type, device group, subscriber or user, user group, application 306, and groups of applications 306 may be stored in local store 308.

Quota information, such as a quota expressed in MBs or GBs and cost for additional quota levels, may be modeled by usage policy application 104 and stored in a local store such as local store 308. Quotas may be modeled and stored on the network service provider level, subscriber level, subscriber group level, for each application 306, and for groups of applications 306.

Threshold information such as the percentage of a quota reached in a period (i.e., monthly, weekly, and/or daily) may also be stored in local store 308. Thresholds may be modeled and stored on the network service provider level, subscriber level, subscriber group level, for each application 306, and for groups of applications 306.

In an embodiment, upon the authorization of a session, a usage breach probability is calculated by a breach probability calculation module (not shown) within quota manager 144. The usage breach probability represents the probability that the subscriber will breach his or her usage quota during the session. The usage breach probability can be based on any information and network usage statistics available at the time the session begins. For example, usage breach probability can be based on, but not limited to, the following information and network usage statistics: the current date, the billing date, the number of breaches for the subscriber, the number of breaches for all subscribers, when breaches have occurred in the past for the subscriber, when breaches have occurred for all subscribers, knowledge of peak usage patterns (e.g., on-peak/off-peak, weekdays), cumulative usage for the subscriber, and usage quota for the subscriber. Further, the following rules can be used to determine the usage breach probability: the probability of a quota breach increases towards the end of the billing period, the probability of a "repeat-offender" subscriber breaching a quota is significantly higher than the general subscriber population, a subscriber is more likely to breach at a time in the billing cycle when historic breaches have occurred, and breaches are more likely to occur at peak usage periods.

The calculated usage breach probability is used by a usage update interval module (not shown) within policy controller 140 to determine the interim interval for the session, in that a higher usage breach probability would be associated with a shorter interim interval. Further, in an embodiment where there are multiple subscribers, each with active subscriber sessions occurring simultaneously, the usage breach probability of the subscriber can be compared to the usage breach probability of other subscribers with active sessions to determine the interim interval for the subscriber. This allows resources to be optimized by using resources to monitor the subscribers most likely to breach. The interim interval is communicated externally via a network provider interface. In embodiments of the invention, the network provider interface can be part of web portal 222 for home network service provider 220 or web portal 232 for roamed network service provider 230.

Upon the lapse of the interim interval, or an end of the subscriber session, a usage update is collected and input to the breach probability calculation module. The breach probability calculation module updates the calculation of the usage breach probability, using the information contained in the usage update. If the amount of usage in the current session is sufficiently high, the usage breach probability may increase.

The breach analysis module also determines the degree the usage data should be analyzed. The degree to which the usage data should be analyzed is based on the updated usage breach probability. For example, a new cumulative usage total may be calculated if the usage breach probability exceeds a first threshold and the new cumulative usage total may be evaluated against the subscriber's usage quota if the usage breach probability exceeds a second threshold. Further, in an embodiment where there are multiple subscribers, each with active sessions occurring simultaneously, the usage breach probability of the subscriber can be compared to the usage breach probability of other subscribers with active sessions to optimize the level of analysis for all subscribers.

Should the second threshold be exceeded, the cumulative usage total is evaluated against the subscriber's usage quota by the breach analysis module and a determination is made as to whether a usage breach has occurred. If a breach has occurred, the appropriate breach action occurs. For example, a notification message can be sent to the subscriber indicating the breach (e.g., SMS), subscriber traffic can be redirected, the subscriber's session can terminate, a billing record may be generated, or any combination of the above actions can be performed. Further, the subscriber's service profile can be updated accordingly.

If a breach has not occurred, a determination is made by the breach analysis module as to whether the update is a final update, as would be the case when a subscriber seeks to end a session. In the case of a final update, a subscriber session is ended and information in the subscriber's service profile is updated accordingly.

In a further embodiment of the current invention, system 300 for providing data communications cost monitoring and controls may optionally generate a marketing response based on the analysis of the subscriber information available. For example, a subscriber who initiates a request to view a video would be notified of the likelihood of an upcoming usage breach such that the subscriber could obtain additional usage quota to support the video request. Such a marketing notification would be based on a current usage breach probability, and preferably would precede a usage breach event by sufficient time so as to add to the growth of the subscriber-network provider relationship. Such a capability is embodied in the special offer interface 1100 described below with reference to FIG. 11, whose coupling to the breach probability calculation module provides the current usage breach probability to the special offer interface 1100. When the current usage breach probability exceeds a marketing threshold, a message communicating a marketing offer (i.e., a 'special offer') may be initiated by the special offer interface 1100 as described below with reference to FIG. 11.

In accordance with an embodiment of the invention, the ability to optimize usage collection and analysis takes advantage of the statistical correlation between various types of information and the usage breach probability of a particular subscriber. The statistical correlation can be captured in a variety of functional relationships. For example, if the three breach factors of day-of-week (designated as breach factor f1), cumulative-usage (f2), and usage-quota (f3) were particularly informative as to the likelihood of a subsequent breach, a possible relationship may be captured as follows:

$$\text{Usage breach probability} = A*f1 + B*f2 + C*f3$$

where A, B, and C are coefficients that have been developed so as to maximize the accuracy of the usage breach probability calculation. Various means may be used to determine these coefficients, including regression analysis. Moreover, the scope of this approach is not limited to linear relationships, but encompasses non-linear relationships, discrete relationships, and time-varying relationships. Similar relationships can also be developed for the interim interval, that can found to depend on such factors as usage breach probability and actual overall usage.

Information regarding data costs incurred may also be modeled by usage policy application 104 and stored in a local store such as local store 308. Data costs may be modeled and stored on the network service provider level, subscriber level, subscriber group level, for each application 306, and for groups of applications 306.

Usage intervals may be stored be stored in local store 308 on a daily, weekly, and monthly basis. Usage intervals pertaining to a plurality of subscribers and user equipment 102 may also be stored in global store 368.

Tariff information for a plurality of networks regarding data prices (i.e., expressed as cost per Byte, MB, or GB) may also be stored in a local store such as local store 308. Tariff information is collected and stored on a network level.

Mobile Usage Policy Application

With continued reference to FIG. 3, in an embodiment, mobile usage policy application 104 provides the functionality described in the following paragraphs.

Mobile usage policy application 104 provides a user interface for monitoring and control (denoted as data flow 3). An exemplary user interface is provided in FIGS. 7-11, which are described in detail below.

Mobile usage policy application 104 also defines the data and policies that application controller 310 and local store 308 require (denoted as data flow 2 in FIG. 3).

The following are the types of data usage policies defined by mobile usage policy application 104 for application controller 310 on user equipment 102.

Mobile usage policy application 104 can set data usage quotas, thresholds (including alert and stop thresholds), allowable maximum tariffs (i.e., tariff limits expressed in tenns of maximum acceptable costs per Byte, MB, or GB), allowable network service providers (i.e., allowed roamed network service providers 230 for a given subscriber, user equipment 102 and/or application 306), and allowable network tariff minimums. For example, mobile usage policy application 104 may only allow a given subscriber, user equipment 102, or application 306 to access a roamed network service provider 230 tariff less than a certain currency amount per storage unit (i.e., US dollars per MB or GB).

Usage Policy Server and Server Side Usage Policy Application

In an embodiment, usage policy server 160 hosts server side usage policy application 164, global store 368, a Global Policy Controller, and web portal 222.

Global store 368 optionally collects data usage information from local stores 308 from a plurality of user equipment 102. In an embodiment, global store 368 comprises a database that provides rolled up, or per user equipment 102, per-subscriber, per-application 306 breakdowns, or views of usage data within various contexts. These contexts may include, but are not limited to, corporations, organizations (i.e., departments), and a subscriber. The level of granularity of data stored in global store 368 allows subscribers and network administrators to run data queries and generate reports regarding data usage for a single subscriber, single user equipment 102, groups of subscribers, and related sets of user equipment 102 (i.e., user equipment leased by an organization or corporations) for a given period. In an embodiment, these queries and reports can be accessed via web portal 222.

Global store 368 on usage policy server 160 optionally stores and distributes the per user equipment 102 information. In this way, usage policy server 160 can be used to provide centralized provisioning of user equipment 102.

Global policy controller 370 is an application on usage policy server 160 that enables access to global store 368 and drives global store 368 to collect information from a plurality of user equipment 102 (denoted as data flow 5). Global policy controller 370 also drives global store 368 to provision information to a plurality of user equipment 102 (denoted as data flow 5).

Provider Based System

Figure 4:
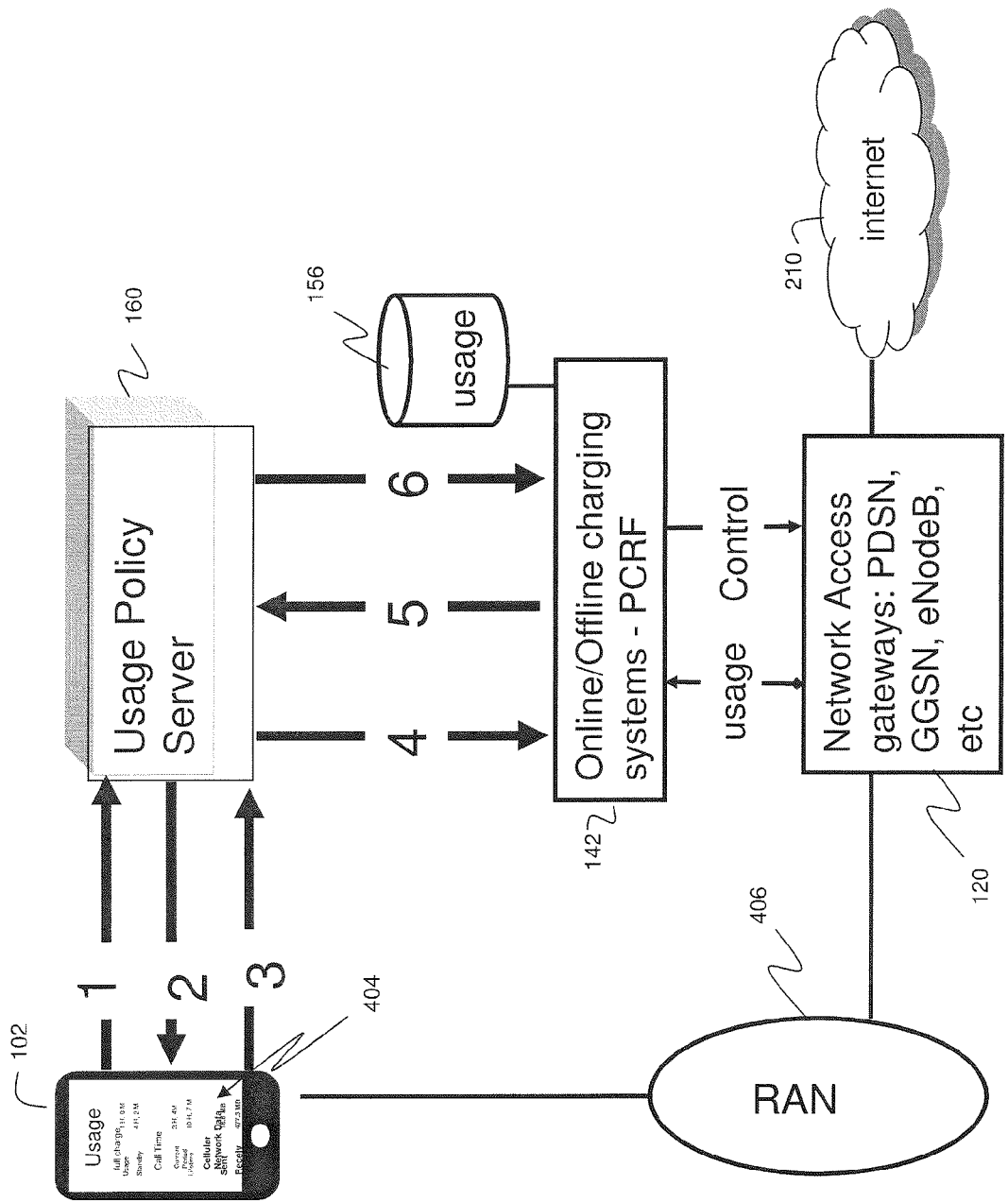
FIG. 4 illustrates a provider-based system architecture for providing data communications cost monitoring and controls within a communications network, in accordance with an embodiment of the present invention.

FIG. 4 illustrates an architecture for a provider-based system 400 for providing data communications cost monitoring and controls within a communications network, in accordance with an embodiment of the present invention.

FIG. 4 is described with continued reference to FIGS. 1-3. However, system 400 is not limited to those embodiments.

In the embodiment of system 400, the infrastructure of a network service provider provides data usage metering and control. Usage policy server 160 provides interface 404 to subscribers using user equipment 102 to allow subscribers to monitor and control charging for data usage.

In an embodiment the data usage metering and control is web based and accessed via web portal 222. Alternatively, data usage metering and control is device application based using interface 404 invoked locally on user equipment 102. Interface 404 allows the device to register with usage policy server 160 (denoted as data flow 1). After registration, user equipment 102 is synchronized with usage policy server 160 and local store 308 is updated (denoted as data flow 2).

Usage policy server 160 also allows subscribers and network administrators to access web interface via web portal 222 to fetch values for data usage attributes (denoted as data flow 3) such as, but not limited to thresholds and quotas on a per application 306, home network service provider 220, roamed network service provider 230, or subscriber basis.

Usage policy server 160 also stores usage data for all registered user equipment 102 in subscriber usage database 156 for a given period (e.g., 2 months).

Usage policy server 160 then registers with online and offline charging systems such as policy and charging rules function (PCRF) 142. In embodiments, the charging systems may include AAA and other protocols, capable of receiving data usage information for user equipment 102.

According to an embodiment, PCRF 142 receives a bulk registration request from usage policy server 160 (denoted as data flow 4). The bulk registration request comprises data usage information for a plurality of user equipment 102 that has registered with usage policy server 160. The data usage information contains threshold and stoppage policies based on criteria such as data volume and the characteristics of roamed network service provider 230.

System 400 can be used to provide flexible policy descriptions for a network service provider's charging plan. For example, a network service provider can furnish its policy and charging rules from PCRF 142 via usage policy server 160. The provider-based architecture illustrated in FIG. 4 enables distribution of flexible policy descriptions corresponding to network service provider charging plans via data flows between PCRF 142 and usage policy server 160.

System 400 and the provider-based architecture depicted in FIG. 4 can also be used to provide flexible tariff distribution. Tariffs comprise information kept for each known potential roamed network service provider 230 in which a subscriber can roam. Access to this information on user equipment 102 is useful when a subscriber wants to determine which potential roamed network service provider 230 will be most cost-effective to use. Tariff information pertaining to a plurality of roamed network service providers 230 may reside in a database or data store on usage policy server 160 to be distributed to a plurality of user equipment 102.

PCRF 142 accesses usage information forwarded by one or more network access gateways 120. In an embodiment, this usage information is received by network access gateway 120 via a radio access network (RAN) 406. PCRF 142 sends usage stream information comprising current data usage information for user equipment 102 to usage policy server 160 (denoted as data flow 5).

Usage policy server 160 requests that PCRF 142 control usage (i.e., affect bearer channel) for user equipment 102 once a stoppage decision is made by PCRF 142 (denoted as data flow 6).

Data Monitoring and Control Methods

Figure 5:
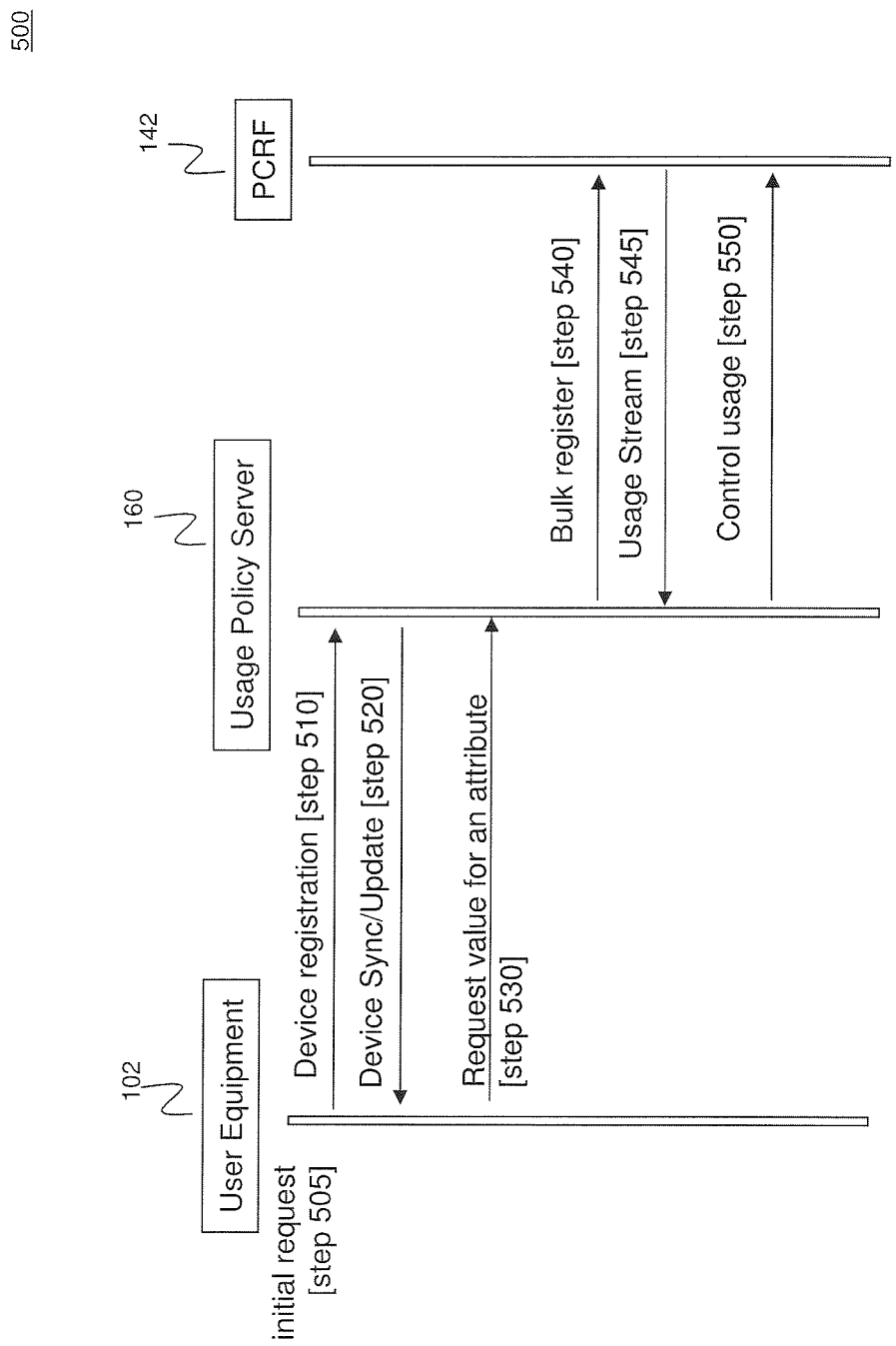
FIG. 5 depicts an exemplary message flow diagram for a method providing data communications cost monitoring and controls when the provider-based architecture provided in FIG. 4 is used, according to an embodiment of the present invention.

FIG. 5 depicts an exemplary message flow diagram for a method 500 for providing data communications cost monitoring and controls when the provider-based architecture provided in FIG. 4 is used, according to an embodiment of the present invention. FIG. 5 is described with continued reference to FIG. 4. However, method 500 is not limited to that embodiment.

In step 505, a subscriber, using interface 404 on user equipment 102 enters data needed to make an initial request to register user equipment 102. In another embodiment, this step is performed by a subscriber accessing a web based user interface via web portal 222 on usage policy server 160.

In step 510, the user equipment 102 device registration request is sent to usage policy server 160.

In step 520, data from subscriber usage database 156 is sent from usage policy server 160 to user equipment 102 in order to synchronize. In this step, user equipment 102 is synchronized with usage policy server 160 and local store 308 is updated.

In step 530, a request to fetch values for data usage attributes is sent from user equipment 102 to usage policy server 160. Attribute/value pairs fetched in this step may include application, subscriber, and/or network-based thresholds and quotas.

In step 540, a bulk registration request is sent from usage policy server 160 to PCRF 142. In this step, a bulk registration request from usage policy server 160 comprising data usage information for a plurality of user equipment 102 that has registered with usage policy server 160 is forwarded to PCRF 142. In an embodiment, the data usage information contains threshold and stoppage policies based on criteria such as data volume and the characteristics of a home network service provider 220 or a roamed network service provider 230.

In step 545, PCRF 142 sends usage stream information comprising current data usage information for user equipment 102 to usage policy server 160.

In step 550, usage policy server 160 sends a request to PCRF 142. In this step, a request to control data usage for user equipment 102 is sent based upon a stoppage decision made by PCRF 142.

Figure 6:
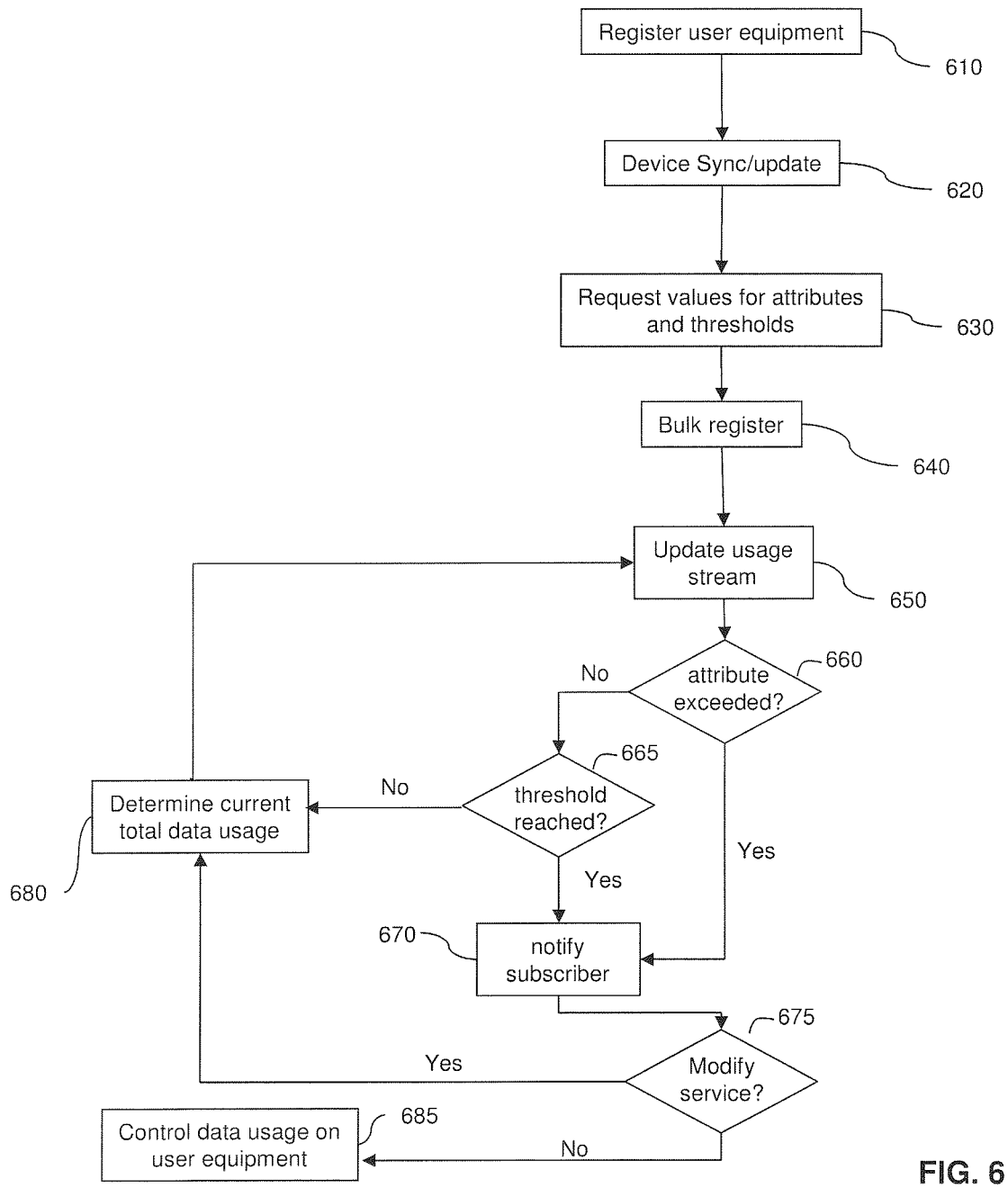
FIG. 6 provides a method for monitoring and controlling data usage in accordance with the present invention.

FIG. 6 depicts a flowchart 600 of an exemplary method for monitoring and controlling data usage, according to embodiments of the present invention.

FIG. 6 is described with continued reference to FIGS. 1-5. However, flowchart 600 is not limited to those embodiments.

In step 610, a user equipment 102 device registration request is sent to a usage policy server 160. In an embodiment this step is performed using interface 404 on user equipment 102. In another embodiment, this step is performed by a subscriber accessing a web based user interface via web portal 222 on usage policy server 160.

In step 620, user equipment 102 is synchronized and updated using data from subscriber usage database 156 sent from usage policy server 160. In this step, local store 308 is updated.

In step 630, values for data usage thresholds and attributes are requested from user equipment 102. In an embodiment, thresholds and attribute/value pairs are tunable or editable on user equipment using interface 404. Attribute/value pairs may include application, subscriber, and/or network-based thresholds and quotas. Thresholds may include percentage usage levels beyond which a notification is to be sent to a subscriber using user equipment 102.

In step 640, bulk registration is performed. The bulk registration includes collecting data usage information for a plurality of user equipment 102 that has registered with a usage policy server 160. The data usage information comprises threshold and stoppage policies based on criteria such as data volume and the characteristics of network service providers.

In step 650, the usage stream for a subscriber is updated. In this step, usage stream information comprising current data usage information for user equipment 102 may be sent to a usage policy server 160.

In step 660, a determination whether an attribute value obtained in step 630 has been exceeded. In this step, a determination is made whether any attribute value has been exceeded, such as a daily MB cap, a cap by an application 306 running on user equipment 102, a cap for user equipment 102, and/or an overall data cap for a subscriber If an attribute has not been exceeded, operation proceeds to step 665. If threshold has been exceeded, operation proceeds to step 670.

In step 665, a determination whether a threshold value obtained in step 630 has been exceeded. In this step, a determination is made whether any threshold has been exceeded, such as a percentage threshold regarding daily usage in MBs, has been reached.

If a threshold has been exceeded, operation proceeds to step 670. If threshold has not been exceeded, operation proceeds to step 680.

In step 670, a notification is sent to subscriber. In this step, a notification may comprise a prompt in interface 404, an email message, a Short Messaging Service (SMS) message, a subscriber notification posted via web portal 222, or any other notification capable of notifying a subscriber that a threshold has been exceeded.

In step 675, after the notification sent in step 670 has been received by a subscriber, a determination is made whether a service characteristic has been changed. In this step, a subscriber, in response to the notification sent in step 670, can optionally change a service tier associated with their subscription in order to alleviate either an exceeded threshold determined in step 665 or an exceeded attribute determined in step 660. In this step, an upgrade to a next service tier can be made when a subscriber is close to reaching bandwidth caps or thresholds.

If a service characteristic is modified, operation proceeds to step 680. If a service characteristics are unchanged, operation proceeds to step 685.

In step 680, current total data usage is determined for user equipment 102. In this step, data usage for applications 306 running on user equipment 102 may also be determined. After collection and calculation of data usage information is performed in this step, control is passed back to step 650.

In step 680, data usage is controlled on user equipment 102 after a subscriber opted to not modify service characteristics in step 675 and the method ends.

Example Graphical User Interfaces

FIGS. 7-11 depict a graphical user interface (GUI) for a mobile device to display data usage, edit usage limits, define tariffs, and accept marketing offers to change service tiers, according to embodiments of the invention.

In an embodiment of the present invention, mobile usage policy application 104 may include the exemplary interface illustrated in FIGS. 7-11. FIGS. 7-11 are described with continued reference to the embodiments illustrated in FIGS. 1-4. However, FIGS. 7-11 are not limited to those embodiments. Throughout FIGS. 7-11, displays are shown with various hyperlinks, command regions, 'turn wheels', buttons, 'slide bars', and data entry fields, which are used to initiate action, invoke routines, enter data, view data, or invoke other functionality. For brevity, only the differences occurring within the figures, as compared to previous or subsequent ones of the figures, are described below.

Figure 7:
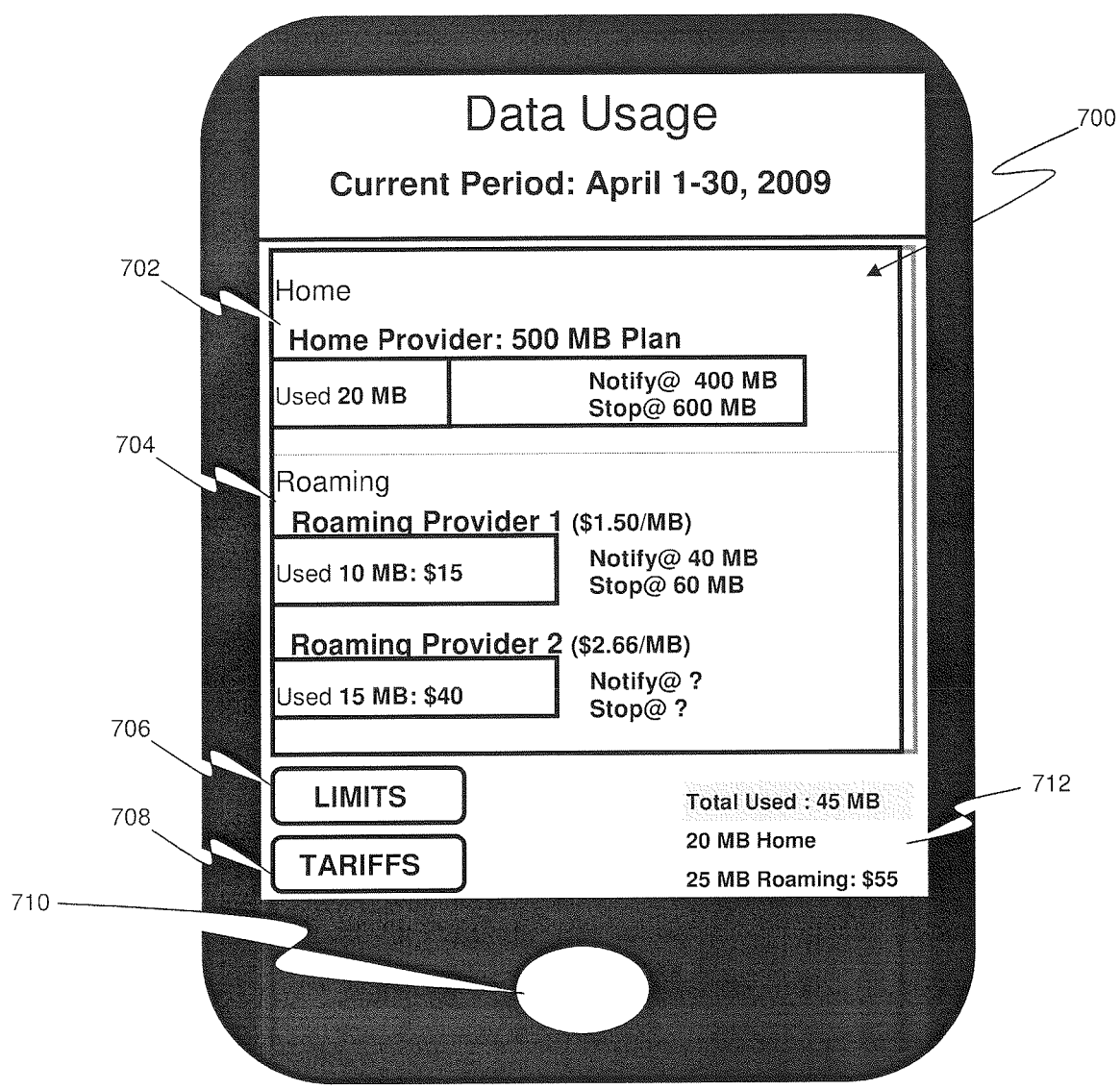
FIGS. 7-11 depict a graphical user interface (GUI) for a mobile device to display data usage, edit usage limits, define tariffs, and accept offers to change service tiers, according to embodiments of the invention.

FIG. 7 illustrates a data usage interface 700 that allows a subscriber to view home data used 702 in home network service provider 220 as compared roamed data used 704 while roaming in roamed network service provider 230 for a given period. In the exemplary embodiment illustrated in FIG. 7, the period is 1 month (e.g., April), but as would as would be understood by those skilled in the relevant art(s) interface 700 could display other data usage periods (i.e., hourly, daily, weekly, etc). In an embodiment, interface 404 comprises interface 700.

A subscriber can set "Notify" and "Stop" limits by selecting, using input device 710, limits button 706. Similarly, a subscriber can display and set tariffs by selecting, using input device 710, tariffs button 708. Interface 700 also displays total data usage 712.

Figure 8:
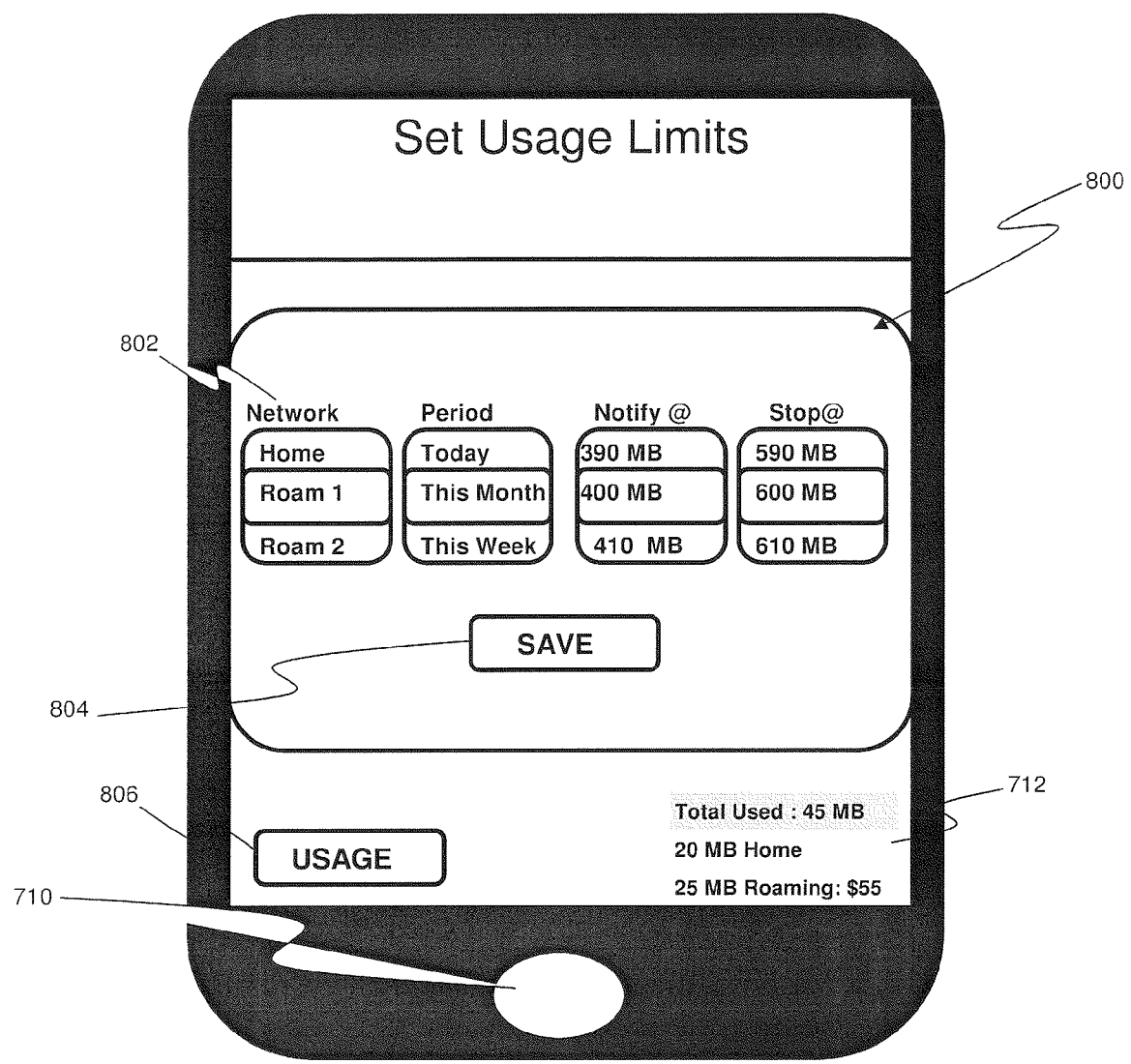

FIG. 8 illustrates a usage limits interface 800 that allows a subscriber to set data usage limits in home network service provider 220 and in roamed network service providers 230. According to an embodiment of the invention, interface 404 comprises interface 800. A subscriber, using input device 710 or a touch screen interface within interface 800 can change usage limits 802 for one or more network service providers. In an embodiment, usage limits 802 are changeable by scrolling through different values by using 'turn wheels' within interface 800. After one or more usage limits 802 have been changed, new usage limits 802 may be saved when a subscriber, using input device 710 or a touch screen interface within interface 800 selects save button 804. Current, updated usage data is displayed when a subscriber, using input device 710 or a touch screen interface within interface 800, selects usage button 806.

Figure 9:
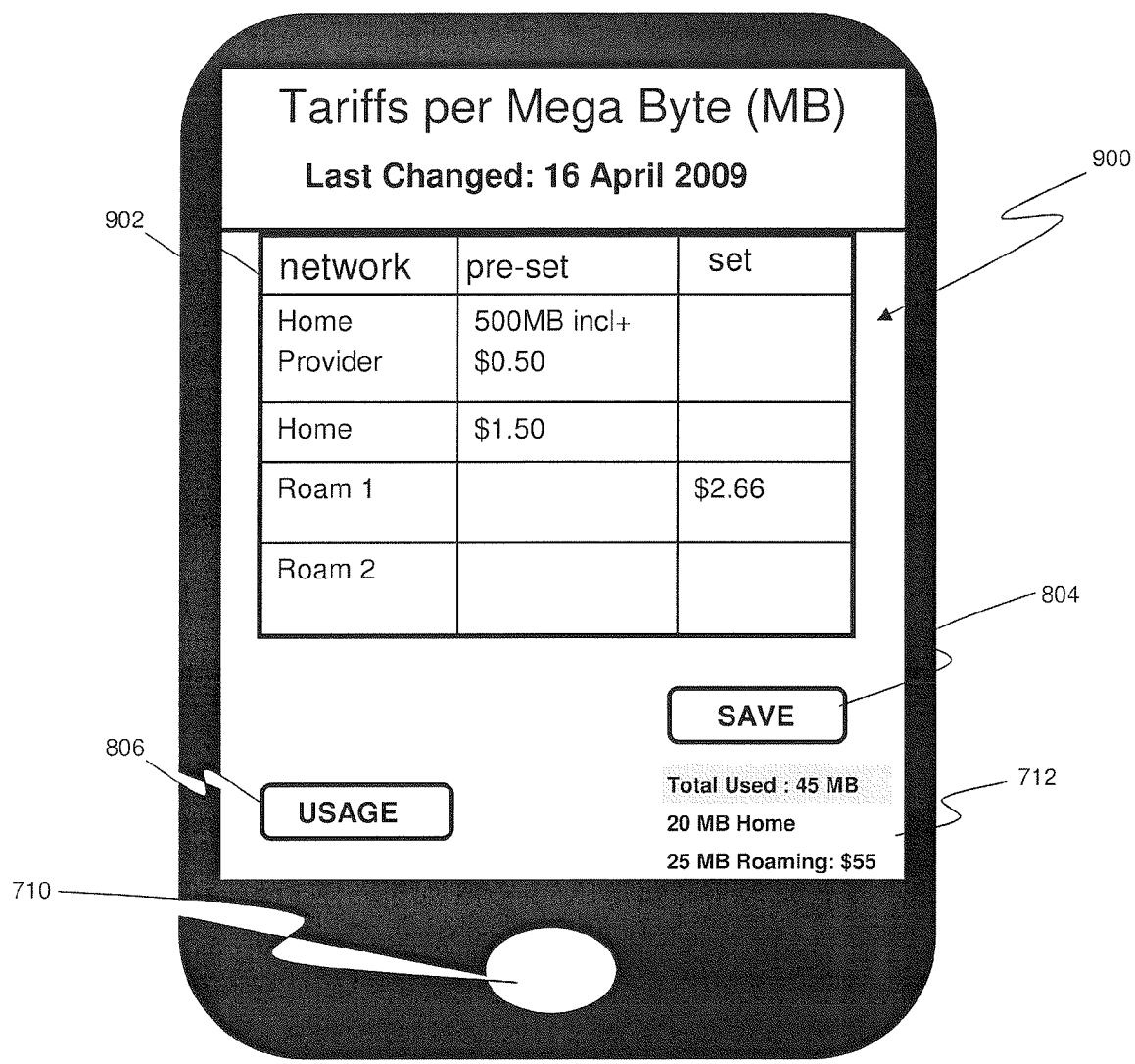

FIG. 9 illustrates a tariffs interface 900 that allows a subscriber to display and define tariffs 902 for home network service provider 220 and for roamed network service providers 230. In embodiment of the invention, interface 404 comprises interface 900. In an embodiment, some pre-set tariffs 902 are provided by the network service providers and other tariffs 902 are editable by the subscriber in interface 900 in cases where the subscriber knows the tariff 902 and a network service providers cannot know the tariff.

Figure 10:
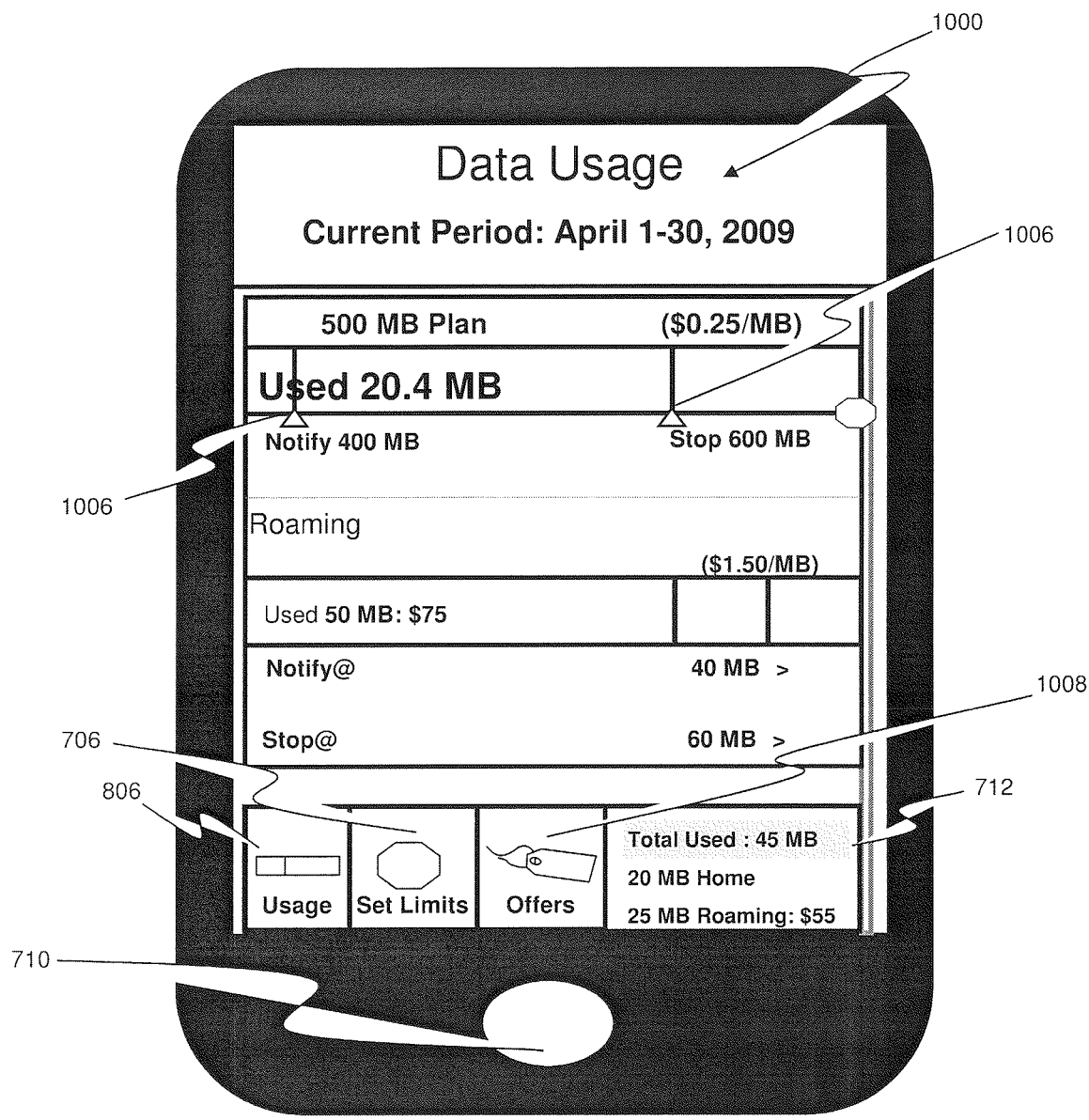

FIG. 10 illustrates an interface 1000 for displaying data usage. Interface 1000 is an alternative embodiment of interface 700 depicted in FIG. 7. A subscriber, using slide bars 1006, can set "Notify" and "Stop" limits. According to an embodiment, a subscriber can display marketing offers by selecting, using input device 710, special offers button 1008. An exemplary interface for displaying and selecting marketing offers is described below with reference to FIG. 11.

Figure 11:
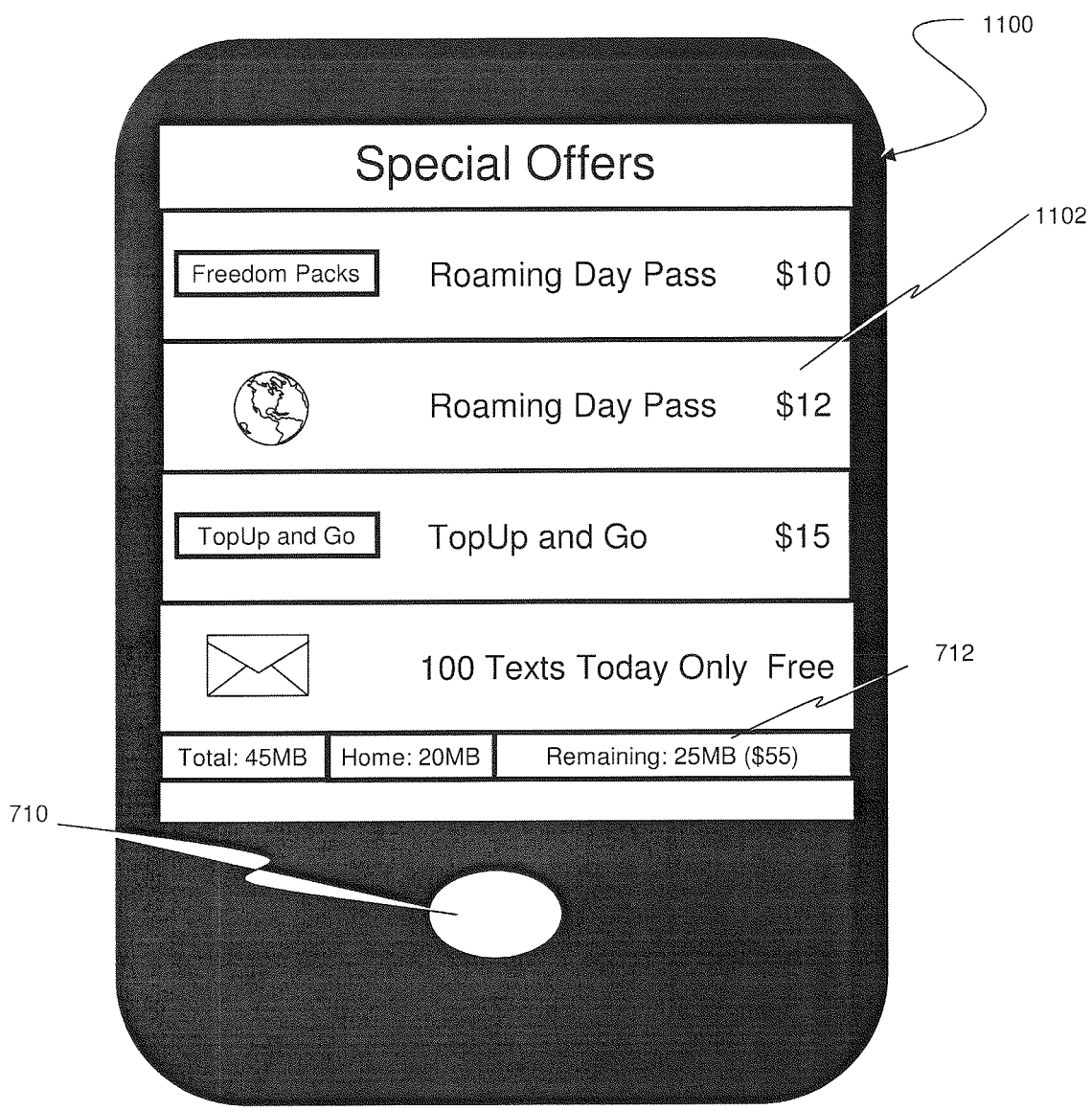

FIG. 11 illustrates an interface 1100 for displaying marketing offers presented to a subscriber by a home network service provider 220 and/or roamed network service providers 230. In an embodiment, some marketing offers 1102 are provided by the home network service provider 220 and other marketing offers 1102 are offered by roamed network service providers 230. In the exemplary embodiment depicted in FIG. 11, marketing offers 1102 can include offers to increase the number of Short Messaging Service (SMS) text messages the subscriber can send and receive, a 'DayPass' on a roamed network, and a 'TopUp and Go' offer to provide a certain amount of additional data usage and/or calling minutes. In an embodiment, marketing offers 1102 may be offered to a user for free or may be offered for sale to the subscriber. In an embodiment, a subscriber can select marketing offers by selecting, using input device 710, links displayed with special offers 1102. Interface 1100 also displays total data usage 712.

Example Computer System Implementation

Figure 12:
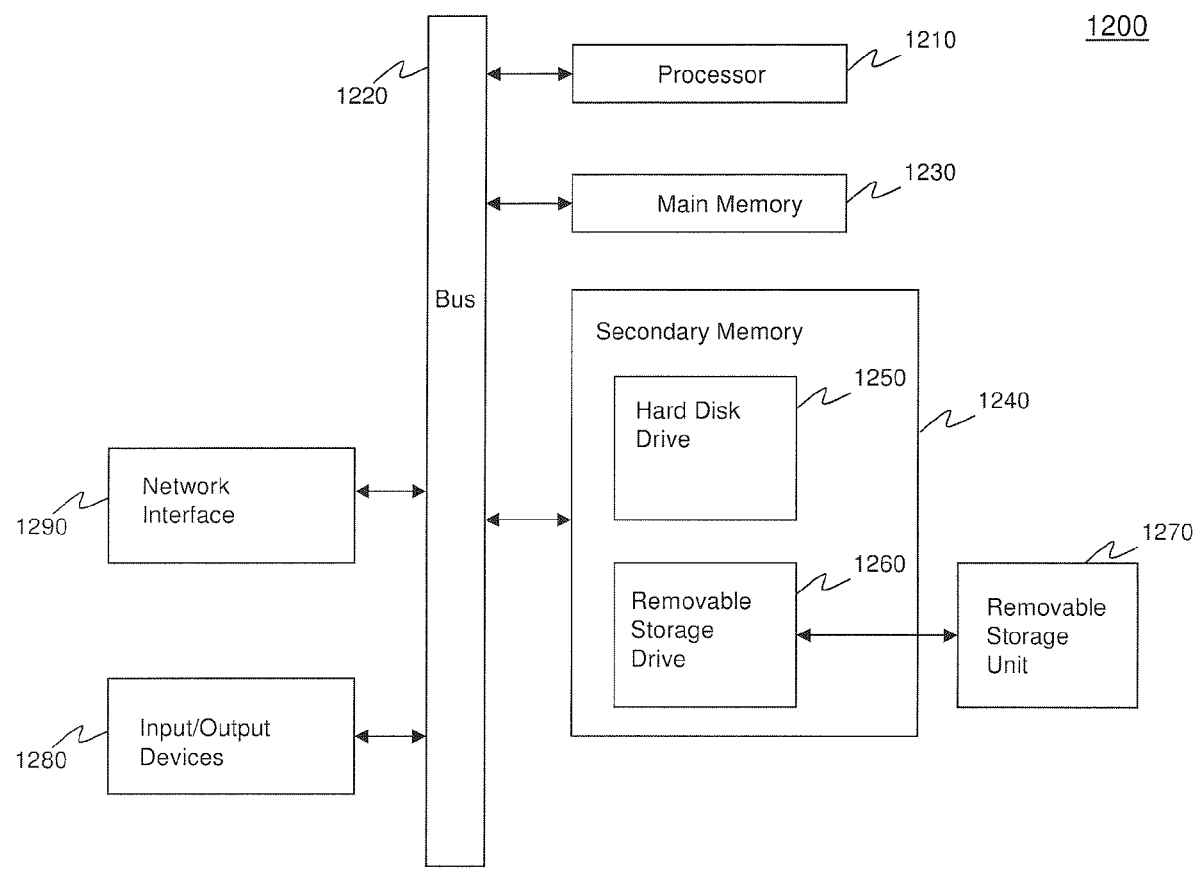
FIG. 12 depicts an exemplary computer system on which methods and systems herein may be implemented, according to embodiments of the present invention.

In an embodiment of the present invention, the methods and systems of the present invention described herein are implemented using well-known computers, such as a computer 1200 shown in FIG. 12. The computer 1200 can be any commercially available and well-known computer capable of performing the functions described herein, such as computers available from International Business Machines, Apple, Sun, HP, Dell, Cray, etc.

Computer 1200 includes one or more processors (also called central processing units, or CPUs), such as processor 1210. Processor 1210 is connected to communication bus 1220. Computer 1200 also includes a main or primary memory 1230, preferably random access memory (RAM). Primary memory 1230 has stored therein control logic (computer software), and data.

Computer 1200 may also include one or more secondary storage devices 1240. Secondary storage devices 1240 include, for example, hard disk drive 1250 and/or removable storage device or drive 1260. Removable storage drive 1260 represents a floppy disk drive, a magnetic tape drive, a compact disk drive, an optical storage device, tape backup, ZIP drive, JAZZ drive, etc.

Removable storage drive 1260 interacts with removable storage unit 1270. As will be appreciated, removable storage drive 1260 includes a computer usable or readable storage medium having stored therein computer software (control logic) and/or data. Removable storage drive 1260 reads from and/or writes to the removable storage unit 1270 in a well-known manner.

Removable storage unit 1270, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 1200, or multiple computer 1200s to perform any combination of the functions described herein Computer programs (also called computer control logic) are stored in main memory 1230 and/or the secondary storage devices 1240. Such computer programs, when executed, direct computer 1200 to perform the functions of the present invention as discussed herein. In particular, the computer programs, when executed, enable processor 1210 to perform the functions of the present invention. Accordingly, such computer programs represent controllers of the computer 1200.

Computer 1200 also includes input/output/display devices 1280, such as monitors, keyboards, pointing devices, etc.

Computer 1200 further includes a communication or network interface 1290. Network interface 1290 enables computer 1200 to communicate with remote devices. For example, network interface 1290 allows computer 1200 to communicate over communication networks, such as LANs, WANs, the Internet, etc. Network interface 1290 may interface with remote sites or networks via wired or wireless connections. Computer 1200 receives data and/or computer programs via network interface 1290. The electrical/magnetic signals having contained therein data and/or computer programs received or transmitted by the computer 1200 via network interface 1290 also represent computer program product(s).

The invention can work with software, hardware, and operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for providing data communications cost monitoring and control for a subscriber session, comprising:

sending, from a mobile device associated with a subscriber to a usage policy server, a registration request associated with the subscriber session and a plurality of quotas associated with the subscriber session, the plurality of quotas including a maximum amount of data usage for a period, a maximum amount of data usage for an application, a maximum amount of data usage for a group of applications, and a maximum amount of data usage for the mobile device associated with the subscriber;

calculating by the usage policy server a usage breach probability for the subscriber, the usage breach probability including a probability that the subscriber will exceed an associated usage quota during the subscriber session, where the usage breach probability is calculated utilizing a plurality of breach factors including a current date, a billing date, a number of breaches for the subscriber, a number of breaches for all subscribers, dates and times when breaches have occurred in the past for the subscriber, dates and times when breaches have occurred for all subscribers, and peak usage patterns;

upon determining that the calculated usage breach probability exceeds a first usage breach threshold, determining by the usage policy server a current data usage associated with the subscriber session;

upon determining that the calculated usage breach probability exceeds a second usage breach threshold, comparing by the usage policy server the determined current data usage against the plurality of quotas associated with the subscriber session;

receiving, at the mobile device, a notification from the usage policy server indicating that the subscriber exceeds a pre-determined portion of one or more of the plurality of quotas during the subscriber session and presenting at the mobile device an option to change a service tier associated with the subscriber session, where the pre-determined portion is indicated by a threshold associated with one or more of the plurality of quotas;

in response to the notification that the subscriber exceeds the pre-determined portion of the one or more quotas, sending, from the mobile device to the usage policy server, a request to change the service tier associated with the subscriber session;

updating, at the usage policy server, the service tier associated with the subscriber session in response to the request to change the service tier, including updating the plurality of quotas associated with the subscriber session;

receiving, from the usage policy server at the mobile device, an updated subscriber profile based upon the updated service tier; and controlling data usage for the subscriber session by the usage policy server when the subscriber exceeds one or more of the updated plurality of quotas during the subscriber session.

2. The method of claim 1, wherein the notification is one or more of an email message, a Short Messaging Service (SMS) message, and a prompt in a user interface.

3. The method of claim 1, wherein determining current data usage comprises:
sending subscriber profile data from a subscriber data repository; and
determining whether one or more of the plurality of quotas have been exceeded based on the service tier associated with the subscriber.

4. The method of claim 1, further comprising:
storing data usage information in a subscriber data repository stored on the mobile device.

5. The method of claim 1, further comprising:
sending, from the mobile device, to the usage policy server, a request to change the threshold associated with the subscriber session; and receiving, at the mobile device, an updated subscriber profile based upon the request to change the threshold.

6. The method of claim 1, further comprising storing data sent and received by each application of the mobile device in a local store of the mobile device, where the data sent and received is stored individually for each application of the mobile device.

7. The method of claim 6, wherein after an application of the mobile device reaches an associated budgeted allocation for a given period, the application of the mobile device is blocked from further data network usage, where the budgeted allocation is located in one or more of the plurality of quotas associated with the subscriber session.

8. The method of claim 1, wherein calculating the usage breach probability includes multiplying each of the plurality of breach factors by a coefficient determined using regression analysis.

9. The method of claim 8, wherein calculating the usage breach probability includes utilizing rules including a rule that a probability of a quota breach increases towards an end of a billing period, a rule that a probability of a repeat-offender subscriber breaching a quota is higher than a general subscriber population, a rule that a subscriber is more likely to breach at a time in the billing cycle when historic breaches have occurred, and a rule that breaches are more likely to occur at peak usage periods.

10. The method of claim 9, wherein the usage breach probability is used by a usage update interval module to determine an interim interval for the subscriber session, where upon a lapse of the interim interval, a usage update is collected and input to a breach probability calculation module, which updates a calculation of the usage breach probability, using the information contained in the usage update.

11. The method of claim 10, wherein a breach analysis module determines a degree to which the data usage information is to be analyzed, where the degree to which the usage data is to be analyzed is based on the updated usage breach probability.

12. A system for providing user-centric data communications cost monitoring and control for a subscriber session, comprising a mobile device including a hardware processor and a usage policy server including another hardware processor for:

sending, from the mobile device associated with a subscriber to the usage policy server, a registration request associated with the subscriber session and a plurality of quotas associated with the subscriber session, the plurality of quotas including a maximum amount of data usage for a period, a maximum amount of data usage for an application, a maximum amount of data usage for a group of applications, and a maximum amount of data usage for the mobile device associated with the subscriber;

calculating by the usage policy server a usage breach probability for the subscriber, the usage breach probability including a probability that the subscriber will exceed an associated usage quota during the subscriber session, where the usage breach probability is calculated utilizing a plurality of breach factors including a current date, a billing date, a number of breaches for the subscriber, a number of breaches for all subscribers, dates and times when breaches have occurred in the past for the subscriber, dates and times when breaches have occurred for all subscribers, and peak usage patterns;

upon determining that the calculated usage breach probability exceeds a first usage breach threshold, determining by the usage policy server a current data usage associated with the subscriber session;

upon determining that the calculated usage breach probability exceeds a second usage breach threshold, comparing by the usage policy server the determined current data usage against the plurality of quotas associated with the subscriber session;

receiving, at the mobile device, a notification from the usage policy server indicating that the subscriber exceeds a pre-determined portion of one or more of the plurality of quotas during the subscriber session and presenting at the mobile device an option to change a service tier associated with the subscriber session, where the pre-determined portion is indicated by a threshold associated with one or more of the plurality of quotas;

in response to the notification that the subscriber exceeds the pre-determined portion of the one or more quotas, sending, from the mobile device to the usage policy server, a request to change the service tier associated with the subscriber session;

updating, at the usage policy server, the service tier associated with the subscriber session in response to the request to change the service tier, including updating the plurality of quotas associated with the subscriber session;

receiving, from the usage policy server at the mobile device, an updated subscriber profile based upon the updated service tier; and controlling data usage for the subscriber session by the usage policy server when the subscriber exceeds one or more of the updated plurality of quotas during the subscriber session.

13. The system of claim 12, the mobile device further comprising a data usage limit module configured to receive and display modifications to data usage limits associated with the subscriber session.

14. The system of claim 13, wherein the data usage limit module is further configured to receive and display modifications to data usage limits associated with one or more applications running on the mobile device.

15. The system of claim 12, the mobile device further comprising a tariff notification module configured to receive notifications of modifications to tariffs associated with the subscriber session.

16. The system of claim 15, wherein the tariff notification module is further configured to display modified tariffs associated with the subscriber session.

17. The system of claim 12, the mobile device further comprising a special offer module configured to receive and display marketing offers from one or more network service providers to alter the service tier associated with the subscriber session.

18. The system of claim 17, wherein the special offer module is further configured to:
 enable the subscriber to accept one or more of the marketing offers; and
 send notification of the acceptance of one or more marketing offers from the mobile device.

19. The system of claim 17, wherein the special offer module is further configured to receive and display marketing offers from a home network service provider associated with the subscriber session.

20. The system of claim 19, wherein the special offer module is further configured to receive and display marketing offers from a roamed network service provider associated with the subscriber session.

* * * * *